US011540236B2

(12) United States Patent
Ibrahim et al.

(10) Patent No.: US 11,540,236 B2
(45) Date of Patent: Dec. 27, 2022

(54) CELL-GROUP TRANSMISSION POWER CONTROL COMMANDS

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Ahmed Attia Abotabl, San Diego, CA (US); Wanshi Chen, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 32 days.

(21) Appl. No.: 17/195,144

(22) Filed: Mar. 8, 2021

(65) Prior Publication Data

US 2022/0286981 A1    Sep. 8, 2022

(51) Int. Cl.
*H04W 52/54* (2009.01)
*H04W 72/04* (2009.01)

(52) U.S. Cl.
CPC ......... *H04W 52/54* (2013.01); *H04W 72/042* (2013.01)

(58) Field of Classification Search
CPC .... H04W 52/54; H04W 72/042; H04L 1/0026
USPC ................................................. 455/522, 69
See application file for complete search history.

(56) References Cited

U.S. PATENT DOCUMENTS

| 8,688,163 | B2* | 4/2014 | Chen | H04W 52/367 |
| | | | | 455/500 |
| 8,965,442 | B2* | 2/2015 | Chen | H04W 52/146 |
| | | | | 455/522 |
| 10,194,400 | B2* | 1/2019 | Zhang | H04W 52/283 |
| 2011/0096815 | A1* | 4/2011 | Shin | H04B 7/0689 |
| | | | | 375/219 |
| 2016/0183195 | A1* | 6/2016 | Gao | H04W 52/325 |
| | | | | 455/522 |
| 2017/0150454 | A1* | 5/2017 | Zhang | H04L 1/005 |

(Continued)

FOREIGN PATENT DOCUMENTS

EP    2496026 A2    9/2012

OTHER PUBLICATIONS

3GPP Technical Specification, TS 38.212, 5G, NR, Multiplexing and Channel Coding (3GPP TS 38.212, Version 17.1.0, Release 17), ETSI, TS 138 212, V17.1.0 (Apr. 2022), 201 Pages.

(Continued)

*Primary Examiner* — Hai V Nguyen
(74) *Attorney, Agent, or Firm* — ArentFox Schiff LLP

(57) ABSTRACT

A victim user equipment (UE) may experience cross-link interference (CLI) from transmissions from an aggressor UE. The present disclosure provides for a cell-group transmission power control (TPC) command that allows the base station to adjust the transmission power of uplink transmissions on multiple cells in order to mitigate cross-link interference. A UE may receive the cell-group TPC command as a single downlink control information (DCI) that indicates a plurality of TPC commands for a plurality of cells that are configured for the UE. The UE may adjust a transmit power for a respective uplink transmission for each respective cell of the plurality of cells based on a respective TPC command of the plurality of TPC commands.

30 Claims, 17 Drawing Sheets

(56) References Cited

U.S. PATENT DOCUMENTS

| | | | |
|---|---|---|---|
| 2018/0332541 A1 | 11/2018 | Liu et al. | |
| 2019/0166610 A1* | 5/2019 | Lee | H04W 72/046 |
| 2020/0119799 A1* | 4/2020 | Jung | H04W 72/042 |
| 2020/0245181 A1* | 7/2020 | Dinan | H04W 52/325 |
| 2020/0288404 A1* | 9/2020 | Nory | H04W 52/08 |
| 2022/0104138 A1* | 3/2022 | Park | H04L 5/0053 |

OTHER PUBLICATIONS

3GPP TS 38.213: "3rd Generation Partnership Project, Technical Specification Group Radio Access Network, NR, Physical Layer Procedures for Control (Release 16)", 3GPP Standard, Technical Specification, Mobile Competence Centre, 650, Route Des Lucioles, F-06921 Sophia-Antipolis Cedex, France, vol. RAN WG1, No. V16.4.0, Jan. 8, 2021, pp. 1-181, XP051999687, URL: https://ftp.3gpp.org/Specs/archive/38_series/38.213/38213-g40.zip38213-g40.docx.

CATT: "Remaining Issues on PUCCH on SCell for Rel-13 CA", 3GPP Draft, 3GPP TSG RAN WG1 Meeting #81, R1-152564, 3rd Generation Partnership Project (3GPP), Mobile Competence Centre, 650, Route Des Lucioles, F-06921 Sophia-Antipolis Cedex, France, vol. RAN WG1, No. Fukuoka, Japan, May 25, 2015-May 29, 2015, May 24, 2015 (May 24, 2015), XP050971631, 2 Pages, Retrieved from the Internet: URL: http://www.3gpp.org/ftp/Meetings_3GPP_SYNC/RAN1/Docs/. [Retrieved on May 24, 2015] Paragraph [02.2].

International Search Report and Written Opinion—PCT/US2022/070270—ISA/EPO—dated May 27, 2022.

\* cited by examiner

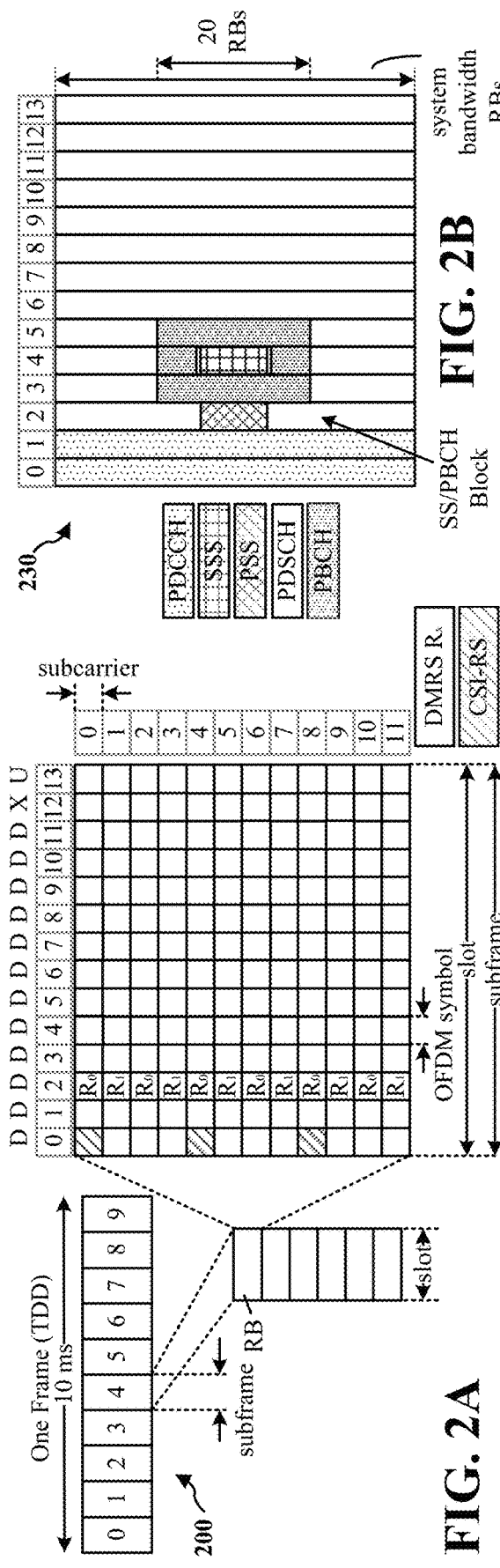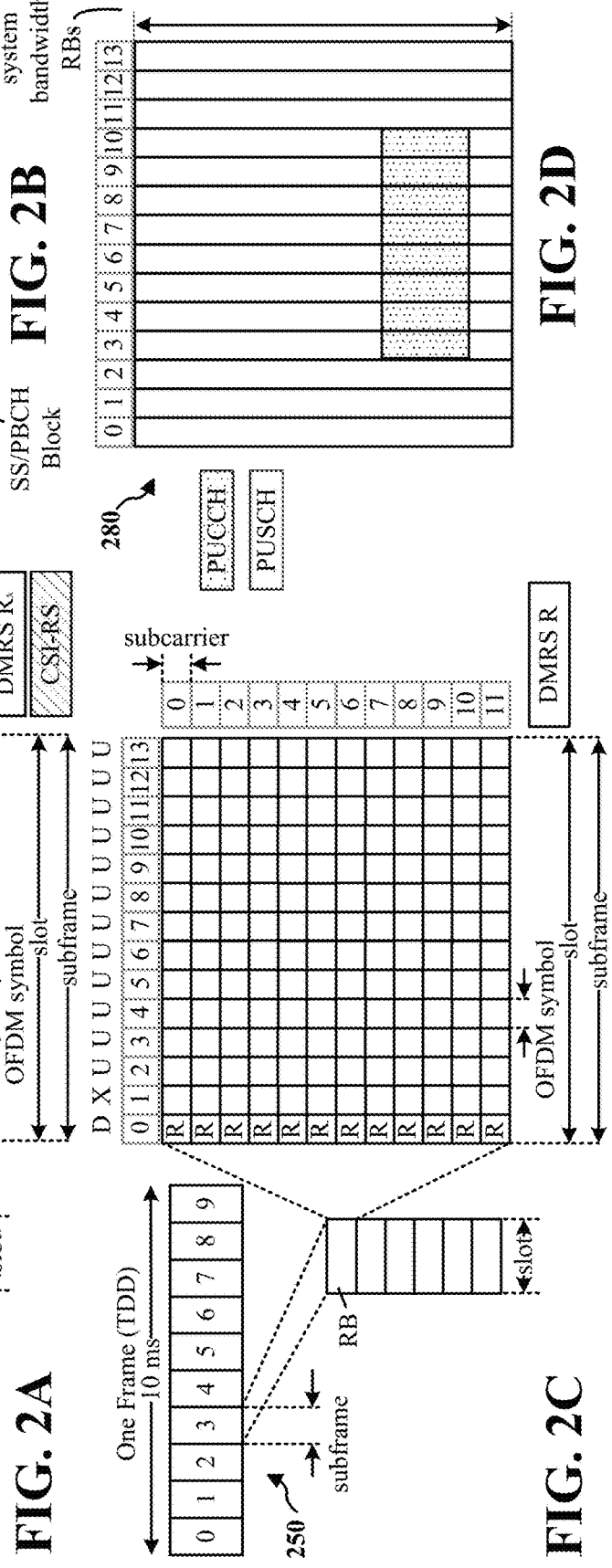

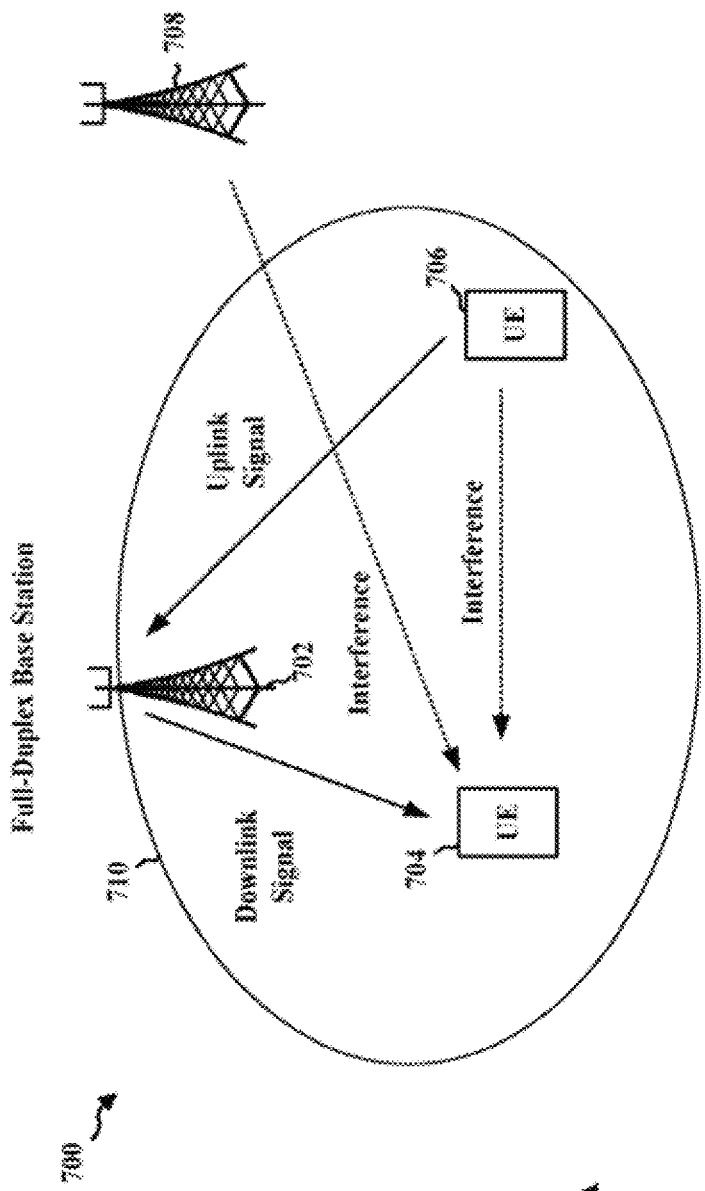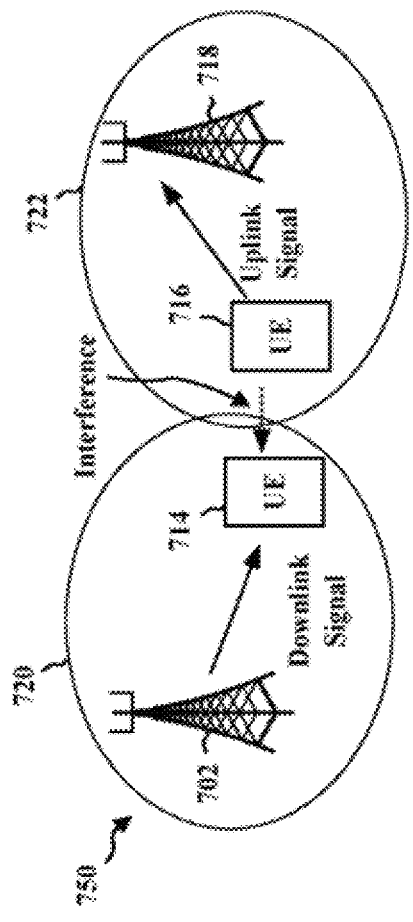
FIG. 7A
FIG. 7B

CELL-GROUP TRANSMISSION POWER CONTROL COMMANDS

BACKGROUND

Technical Field

The present disclosure relates generally to communication systems, and more particularly to, cell-group transmission power control commands.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a non-transitory computer-readable medium, and an apparatus are provided. The method may include receiving a single downlink control information (DCI) that indicates a plurality of transmission power control (TPC) commands for a plurality of cells that are configured for the UE. The method may include adjusting a transmit power for a respective uplink transmission for each respective cell of the plurality of cells based on a respective TPC command of the plurality of TPC commands.

In some implementations, the single DCI is a unicast DCI. For example, the unicast DCI may include a sequence of pairs of a cell identifier and a corresponding TPC value. In such implementations, adjusting the transmit power for a respective cell of the plurality of cells may include determining a transmit power adjustment for the respective cell based on the corresponding TPC value paired with the cell identifier of the respective cell. In another example, the unicast DCI includes a plurality of blocks defining a plurality of DCI positions, each of the plurality of blocks is mapped to a respective cell of the plurality of cells and defines a TPC value for the respective cell. In another example, the unicast DCI includes a TPC value that is mapped to a sequence of transmit power adjustments that defines the plurality of TPC commands. In another example, the unicast DCI is a non-scheduling DCI and one or more scheduling fields of the non-scheduling DCI are interpreted as the plurality of TPC commands.

In some implementations, the single DCI is a group-common DCI indicating a sequence of TPC values for the UE and at least one TPC value for another UE, and wherein each of the TPC values for the UE is mapped to one of the plurality of cells configured for the UE. For example, the group-common DCI may include a first part defining a single TPC command for one or more other UEs, and a second part defining the sequence of TPC values for at least the UE. In another example, the UE may be configured with a DCI position for monitoring for the sequence of TPC values for the UE. In another example, the UE is configured to receive the group-common DCI on one of the plurality of cells configured for the UE.

In some implementations, the single DCI indicates the plurality of TPC commands based on one or more TPC values that are mapped to a table of transmit power adjustments for cell-group TPC.

In some implementations, the single DCI includes a single TPC value for the plurality of TPC commands and wherein the plurality of cells configured for the UE to which the plurality of TPC commands are applicable includes cells that are configured with an uplink slot and adjacent in frequency to one or more cells configured with a concurrent downlink slot.

In some implementations, the single DCI includes a single TPC value and the UE is configured with a mapping between the single TPC value and the TPC command for each of the plurality of cells.

In some implementations, the method includes transmitting an indication of a capability to support one or more of: a cell-group TPC command, a cell-group TPC command via unicast DCI, or a cell-group TPC command via group-common DCI.

The disclosure also provides an apparatus including a memory storing computer-executable instructions and at least one processor configured to execute the computer-executable instructions to perform the above method, an apparatus including means for performing the above method, and a non-transitory computer-readable medium storing computer-executable instructions for performing the above method.

In another aspect, a method, a non-transitory computer-readable medium, and an apparatus for a base station are provided. The method may include transmitting a single DCI that indicates a plurality of TPC commands for a plurality of cells configured for at least one UE. The method may include receiving, from the at least one UE, a respective uplink transmission on each of the plurality of cells based on a respective TPC command of the plurality of TPC commands.

The implementations of the single DCI discussed above may also be applicable to the method performed by the base station.

In some implementations, the method may include comprising transmitting a radio resource control (RRC) message that configures the first UE to receive the group-common DCI on one of the plurality of cells configured for the first UE.

In some implementations, the plurality of cells includes cells that are configured with an uplink slot and adjacent in frequency to one or more cells configured with a concurrent downlink slot.

In some implementations, the method may include receiving an indication of a capability of the UE to support one or more of: a cell-group TPC command, a cell-group TPC command via unicast DCI, or a cell-group TPC command via group-common DCI.

The disclosure also provides an apparatus including a memory storing computer-executable instructions and at least one processor configured to execute the computer-executable instructions to perform the above method, an apparatus including means for performing the above method, and a non-transitory computer-readable medium storing computer-executable instructions for performing the above method.

The disclosure also provides an apparatus including a memory storing computer-executable instructions and at least one processor configured to execute the computer-executable instructions to perform the above method, an apparatus including means for performing the above method, and a non-transitory computer-readable medium storing computer-executable instructions for performing the above method.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with certain aspects of the present description.

FIG. 2B is a diagram illustrating an example of downlink (DL) channels within a subframe, in accordance with certain aspects of the present description.

FIG. 2C is a diagram illustrating an example of a second frame, in accordance with certain aspects of the present description.

FIG. 2D is a diagram illustrating an example of uplink (UL) channels within a subframe, in accordance with certain aspects of the present description.

FIGS. 7A and 7B illustrate examples of intra-cell and inter-cell interference.

DETAILED DESCRIPTION

Figure 1:
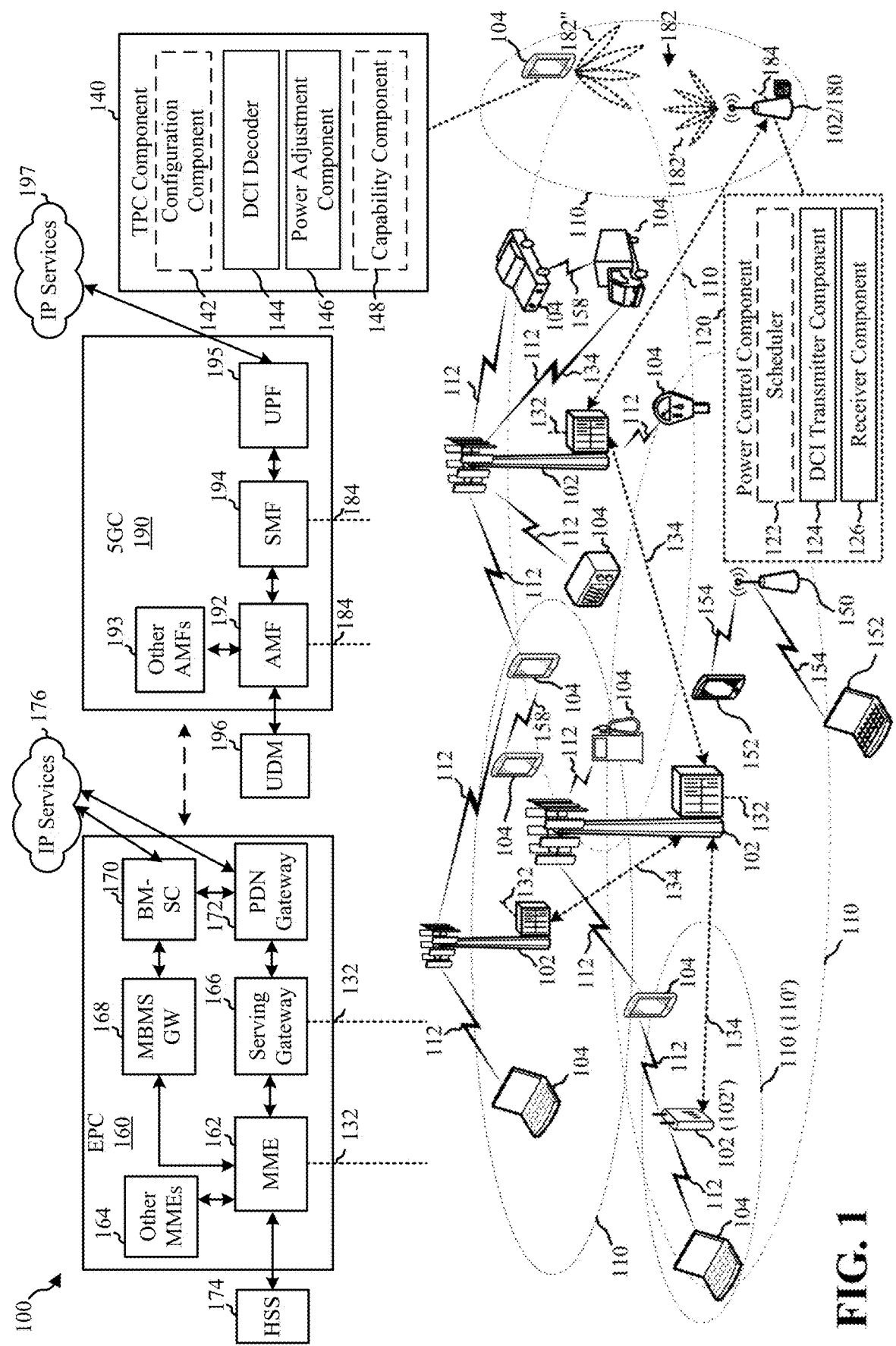
FIG. 1 is a diagram illustrating an example of a wireless communications system and an access network, in accordance with certain aspects of the present description.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. Although the following description may be focused on 5G NR, the concepts described herein may be applicable to other similar areas, such as LTE, LTE-A, CDMA, GSM, and other wireless technologies.

Full duplex communication may allow a wireless communication device to transmit and receive at the same time. In-band full duplex (IBFD) may refer to transmission and reception on the same time and frequency resource. The uplink (UL) and the downlink (DL) may share the same IBFD time and frequency resource, which may include fully overlapping resources or partially overlapping resources. Sub-band frequency division duplexing (SBFD) may refer to transmission and reception at the same time on different frequency resources. The DL resource may be separated from the UL resource in the frequency domain. In an access network, a base station and/or a user equipment (UE) may be capable of either IBFD or SBFD.

The presence of full duplex devices in an access network may result in configurations with different types of interference experienced by a UE. Inter-cell interference may include interference from other gNBs and exist without the presence of full duplex devices. Inter-cell cross-link interference (CLI) may occur between UEs in adjacent cells. Intra-cell CLI may occur between UEs in the same cell. For example, an uplink transmission from an aggressor UE may interfere with a downlink reception of a victim UE. In the case of a full-duplex UE, self-interference (SI) may be considered a special case of intra-cell CLI, where the transmitter of the UE acts as an aggressor UE that interferes with a downlink reception by the receiver of the UE.

One approach to mitigate CLI is transmission power control (TPC) for uplink transmissions such as PUCCH and PUSCH. For example, the base station may reduce the transmission power of uplink transmissions to mitigate inter-cell CLI or intra-cell CLI. In many scenarios with CLI, a UE may be configured with carrier aggregation (CA) and communicate on multiple cells. Conventional TPC commands for uplink transmissions are applicable to a single cell for a UE. For example, TPC commands may include a unicast downlink control information (DCI) that indicates a TPC command for uplink transmissions for a single cell. A group-common DCI may also carry TPC commands for uplink transmissions for a plurality of UEs. The group-common DCI, however, may only carry a single TPC command per UE. Accordingly, for controlling CLI, the base station may transmit multiple DCI to the same UE in order to reduce transmit power for multiple cells. The multiple DCIs may increase overhead and processing at the UE.

In an aspect, the present disclosure provides for a cell-group TPC command that indicates a plurality of TPC commands for uplink transmissions for a plurality of cells configured for at least one UE. The cell-group TPC command may be either a unicast DCI or a group-common DCI. For example, a unicast DCI may include a sequence of pairs of cell identifiers and corresponding TPC values or a plurality of blocks that are mapped to the TPC commands for the plurality of cells. As another example, the cell-group TPC command may be a group-common DCI that includes a sequence of TPC values for two or more UEs. In either case, the UE may identify the plurality of TPC commands carried by the DCI. The UE may adjust the transmit power for each respective cell of the plurality of cells based on a respective TPC command of the plurality of TPC commands. Accordingly, the base station may transmit a single DCI to a UE to adjust the transmit power of multiple cells to mitigate CLI.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network (e.g., a 5G Core (5GC) 190). The UEs 104 may include an aggressor UE 104a and a victim UE 104b. The base stations 102 may include macrocells (high power cellular base station) and/or small cells (low power cellular base station). The macrocells include base stations. The small cells include femtocells, picocells, and microcells.

One or more of the UEs 104 may include a TPC component 140 that controls a transmission power of the UE 104 on a plurality of cells. The TPC component 140 may optionally include a configuration component 142 configured to receive, from a base station, a configuration of a plurality of cells for the UE 104. The TPC component 140 may include a DCI decoder 144 configured to receive a single DCI that indicates a plurality of TPC commands for the plurality of cells configured for the UE. The TPC component 140 may include a power adjustment component 146 configured to adjust a transmit power for an uplink transmission for each respective cell of the plurality of cells based on a respective TPC command of the plurality of TPC commands. In some implementations, the TPC component 140 may optionally include a capability component 148 configured to transmit an indication of one or more capabilities of the UE 104 related to cell-group TPC commands.

In an aspect, one or more of the base stations 102 may include a power control component 120 that performs the actions of the base station as described herein (e.g., scheduling transmissions and controlling uplink transmission power via cell-group TPC commands). For example, the power control component 120 may optionally include a scheduler 122 configured to schedule a UE with uplink transmission on two or more cells. The power control component 120 may include a DCI transmitter component 124 configured to transmit a single DCI that indicates a plurality of TPC commands for a plurality of cells configured for at least one UE. The power control component 120 may include a receiver component 126 configured to receive, from the at least one UE, a respective uplink transmission on each of the plurality of cells based on a respective TPC command of the plurality of TPC commands.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The backhaul links 132 may be wired or wireless. The base stations 102 configured for 5G NR (collectively referred to as Next Generation RAN (NG-RAN)) may interface with 5GC 190 through backhaul links 184. The backhaul links 184 may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 112 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 112 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL).

The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and a physical sidelink feedback channel (PSFCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIGS. 2A-2D are resource diagrams illustrating example frame structures and channels that may be used for uplink, downlink, and sidelink transmissions to a UE 104 including a TPC component 140. FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu * 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
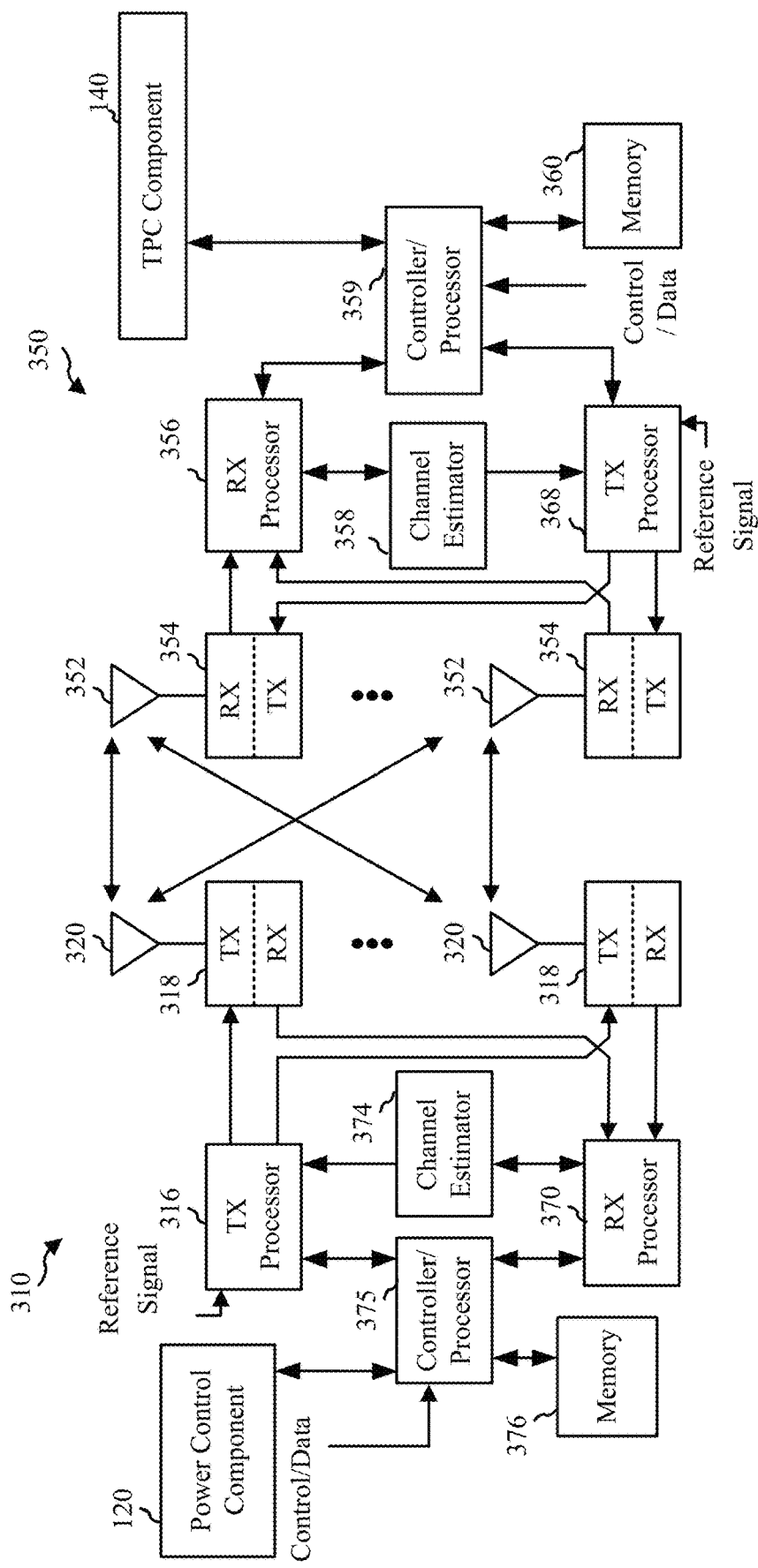
FIG. 3 is a diagram illustrating an example of a base station and user equipment (UE) in an access network, in accordance with certain aspects of the present description.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160 or 5GC 190. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the TPC component 140 of FIG. 1.

At least one of the TX processor 316, the RX processor 370, and the controller/processor 375 may be configured to perform aspects in connection with the power control component 120 of FIG. 1.

Figure 4A:
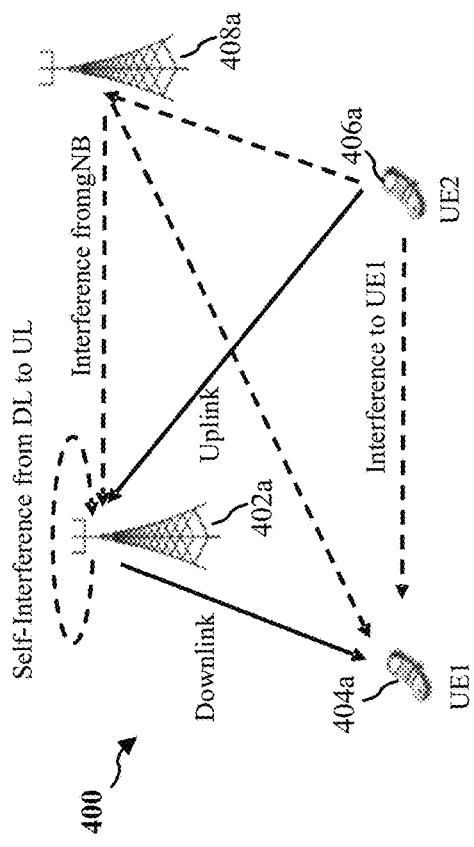
FIGS. 4A, 4B, and 4C illustrate exemplary modes of full-duplex communication.
Figure 4C:
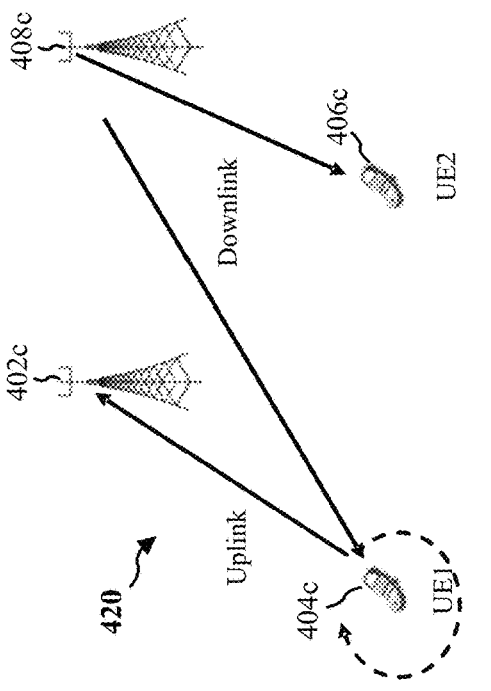
Figure 4B:
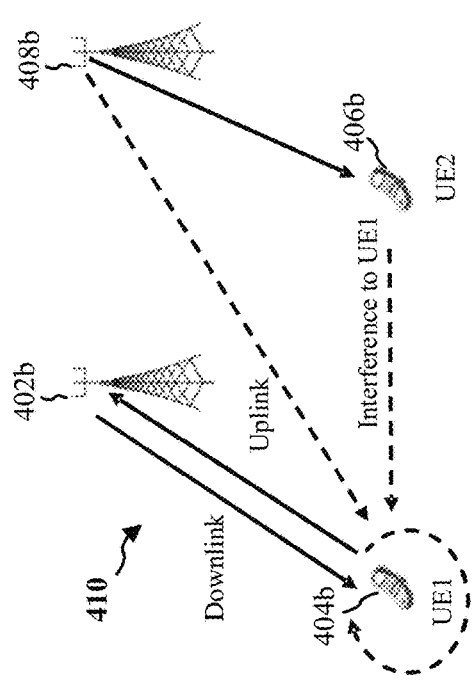

FIGS. 4A-4C illustrate various modes of full-duplex communication. Full-duplex communication supports transmission and reception of information over a same frequency band in manner that overlap in time. In this manner, spectral efficiency may be improved with respect to the spectral efficiency of half-duplex communication, which supports transmission or reception of information in one direction at a time without overlapping uplink and downlink communication. Due to the simultaneous Tx/Rx nature of full-duplex communication, a UE or a base station may experience self-interference caused by signal leakage from its local transmitter to its local receiver. In addition, the UE or base station may also experience interference from other devices, such as transmissions from a second UE or a second base station. Such interference (e.g., self-interference or interference caused by other devices) may impact the quality of the communication, or even lead to a loss of information.

FIG. 4A shows a first example of full-duplex communication 400 in which a first base station 402a is in full duplex communication with a first UE 404a and a second UE 406a. The first base station 402a is a full-duplex base station, whereas the first UE 404a and the second UE 406a may be configured as either a half-duplex UE or a full-duplex UE. The second UE 406a may transmit a first uplink signal to the first base station 402a as well as to other base stations, such as a second base station 408a in proximity to the second UE 406a. The first base station 402a transmits a downlink signal to the first UE 404a concurrently with receiving the uplink signal from the second UE 406a. The base station 402a may experience self-interference from the receiving antenna that is receiving the uplink signal from UE 406a receiving some of the downlink signal being transmitted to the UE 404a. The base station 402a may experience additional interference due to signals from the second base station 408a. Interference may also occur at the first UE 404a based on signals from the second base station 408a as well as from uplink signals from the second UE 406a.

FIG. 4B shows a second example of full-duplex communication 410 in which a first base station 402b is in full-duplex communication with a first UE 404b. In this example, the first base station 402b is a full-duplex base station and the first UE 404b is a full-duplex UE. The first base station 402b and the UE 404b that can concurrently receive and transmit communication that overlaps in time in a same frequency band. The base station and the UE may each experience self-interference, in which a transmitted signal from the device is leaked to a receiver at the same device. The first UE 404b may experience additional interference based on one or more signals emitted from a second UE 406b and/or a second base station 408b in proximity to the first UE 404b.

FIG. 4C shows a third example of full-duplex communication 420 in which a first UE 404c is a full-duplex UE in communication with a first base station 402c and a second base station 408c. The first base station 402c and the second base station 408c may serve as multiple transmission and reception points (multi-TRPs) for UL and DL communication with the UE 404c. The second base station 408c may be in communication with a second UE 406c. In FIG. 4C, the first UE 404c may concurrently transmit an uplink signal to the first base station 402c while receiving a downlink signal from the second base station 408c. The first UE 404c may experience self-interference as a result of the first signal and the second signal being communicated simultaneously, e.g., the uplink signal may leak to, e.g., be received by, the UE's receiver. The first UE 404c may experience additional interference from the second UE 406c.

Figures 5A, 5B, 5C:
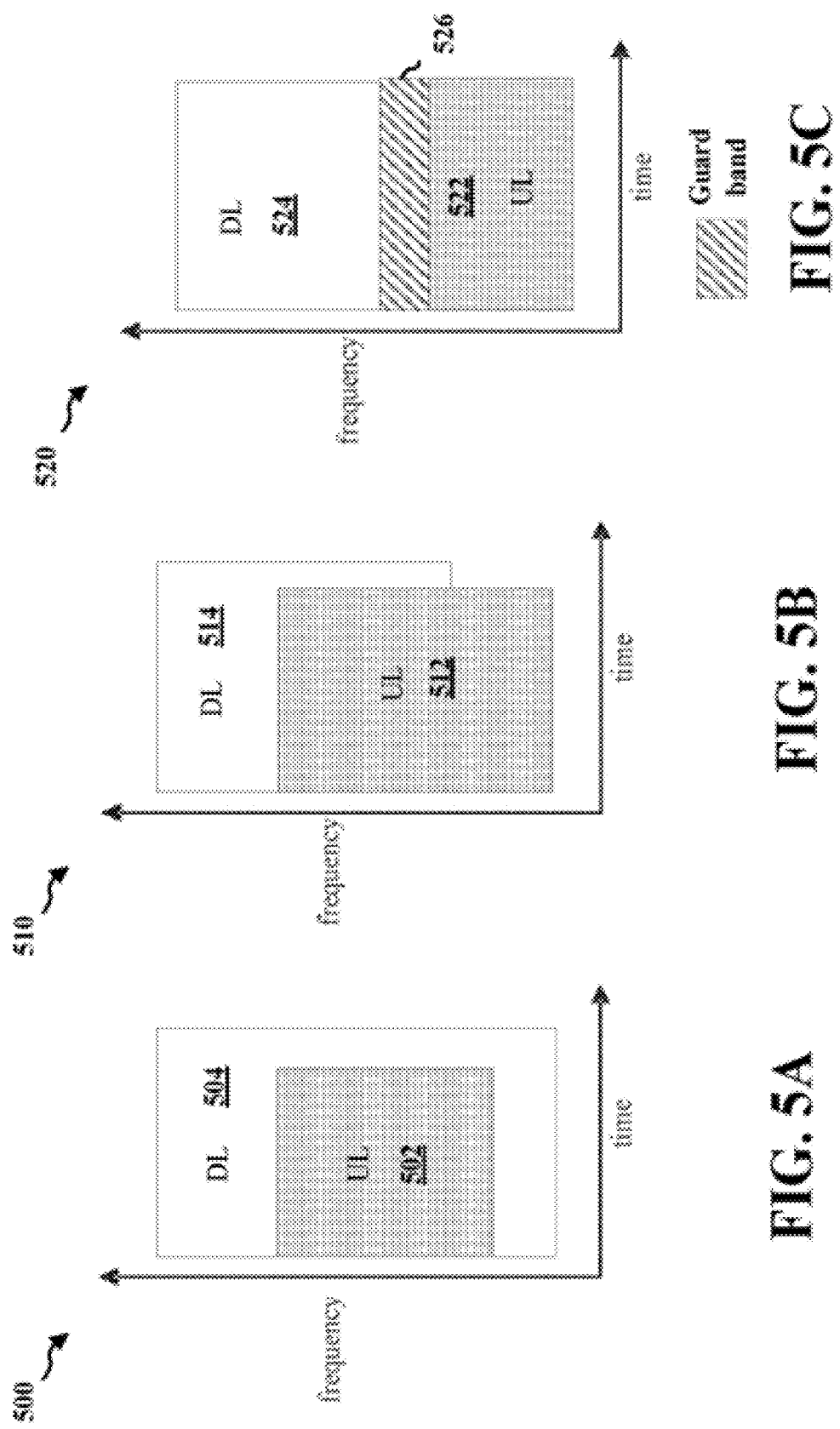
FIGS. 5A and 5B illustrate examples of resources that are in-band full duplex (IBFD).
FIG. 5C illustrates an example of resources for sub-band full-duplex (SBFD) communication.

FIGS. 5A-5B illustrate a first example 500 and a second example 510 of in-band full duplex (IBFD) resources. FIG. 5C illustrates an example 520 of sub-band full-duplex resources. In IBFD, signals may be transmitted and received in overlapping times and overlapping in frequency. As shown in the first example 500, a time and a frequency allocation of a UL resources 502 may fully overlap with a time and a frequency allocation of DL resources 504. In the second example 510, a time and a frequency allocation of UL resources 512 may partially overlap with a time and a frequency of allocation of DL resources 514.

IBFD is in contrast to sub-band FD (SBFD), where uplink and downlink resources may overlap in time using different frequencies, as shown in FIG. 5C. As shown in FIG. 5C, the UL resources 522 are separated from the DL resources 524 by a guard band 526. The guard band may be frequency resources, or a gap in frequency resources, provided between the UL resources 522 and the DL resources 524. Separating the UL frequency resources and the DL frequency resources with a guard band may help to reduce self-interference. UL resources and a DL resources that are immediately adjacent to each other correspond to a guard band width of 0. As an output signal, e.g., from a UE transmitter may extends outside the UL resources, the guard band may reduce interference experienced by the UE. Sub-band FD may also be referred to as "flexible duplex".

Figure 6:
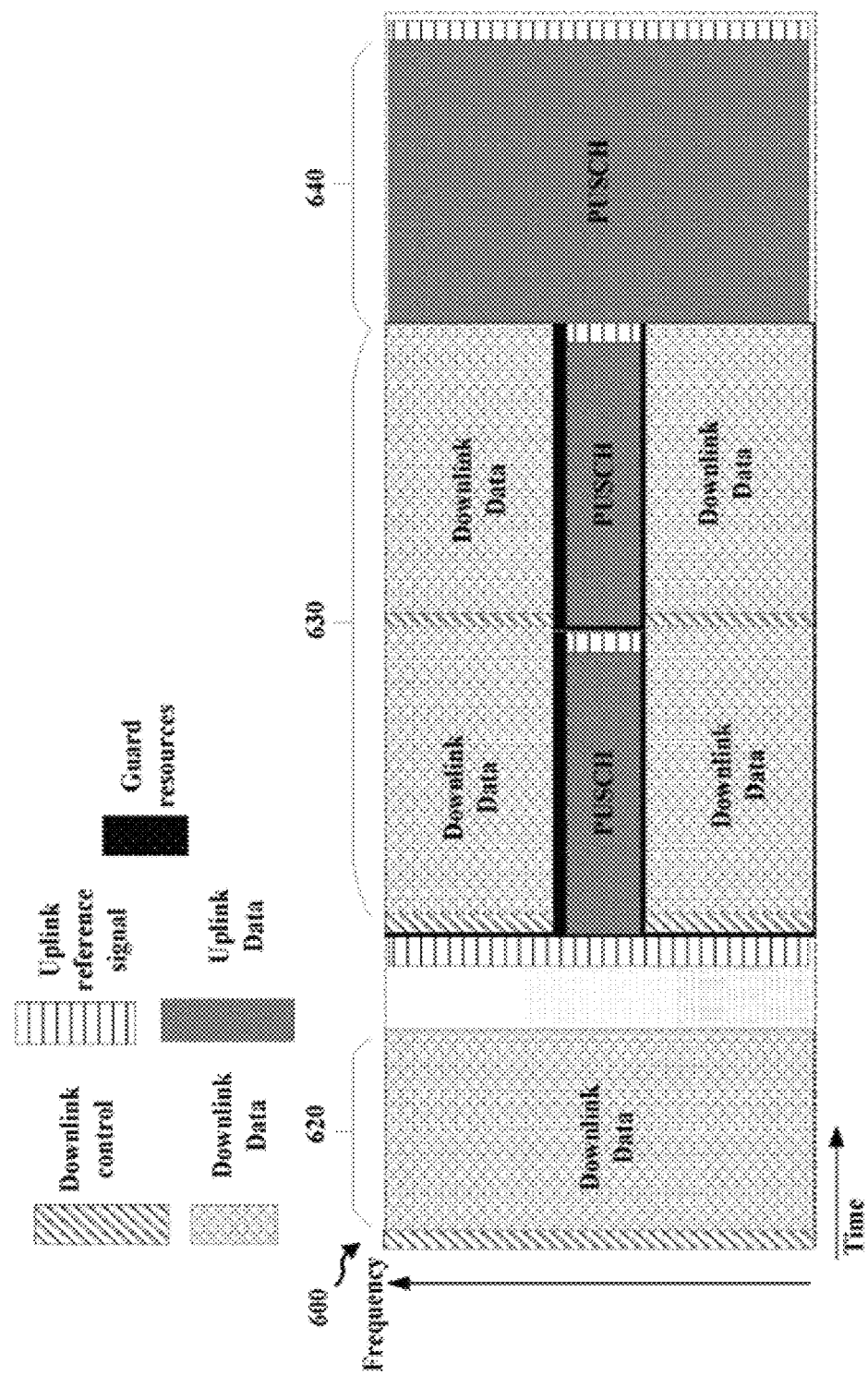
FIG. 6 is an example of time and frequency resources including full-duplex resources.

FIG. 6 illustrates an example set of time and frequency resources 600 that include both half duplex and full duplex periods. For example, the period of time 620 includes half duplex resources for downlink data. The period of time 620 includes sub-band full-duplex resources for uplink transmissions (e.g., PUSCH) and downlink reception (e.g., downlink data). The period of time 640 includes half duplex resources for uplink data.

A slot format may be referred to as a "D+U" slot when the slot has a frequency band that is used for both uplink and downlink transmissions. The downlink and uplink transmissions may occur in overlapping frequency resources, such as shown in FIGS. 5A and 5B (e.g., in-band full duplex resources) or may occur in adjacent or slightly separated frequency resources, such as shown in FIG. 5C (e.g., sub-band full duplex resources). In a particular D+U symbol, a half-duplex device may either transmit in the uplink band or receive in the downlink band. In a particular D+U symbol, a full-duplex device may transmit in the uplink band and receive in the downlink band, e.g., in the same symbol or in the same slot. A D+U slot may include downlink only symbols, uplink only symbols, and full-duplex symbols. For example, in FIG. 6, the period of time 620 may extend for one or more symbols (e.g., downlink only symbols), the period of time 640 may extend for one or more symbols (e.g., uplink only symbols), and the period 630 may extend for one or more symbols (e.g., full-duplex symbols or D+U symbols).

FIG. 7A illustrates an example communication system 700 with a full-duplex base station 702 that includes intra-cell cross-link interference (CLI) caused to UE 704 by UE 706 that are located within the same cell coverage 710 as well as inter-cell interference from a base station 708 outside of the cell coverage 710. FIG. 7B illustrates an example communication system 750 showing inter-cell cross-link interference from UE 716 that interferences with downlink reception for UE 714. The UE 714 is in the cell coverage 720 of base station 712, and the UE 716 is in the cell coverage 722 of the base station 718. Although not shown, a full-duplex UE may cause self-interference to its own downlink reception.

In SBFD communications, a base station may configure a downlink transmission to a UE in frequency domain resources that are adjacent to frequency domain resources for uplink transmissions for another UE. For example, in FIG. 7A, the frequency resources for the downlink transmission to the UE 704 may be adjacent to the frequency resources for the uplink transmission from the UE 706.

Another scenario where CLI may occur is asynchronous or semi-synchronous schemes. Different base stations may utilize the same or different directions on one or more slots, which may result in interference between the base stations. For example, a downlink transmission from one base station may interfere with an uplink transmission to another base station. In some scenarios such as URLLC use cases, in order for the base station to reliably receive the uplink transmission, the base station may schedule the uplink transmission in either a dedicated uplink slot or use uplink slots with possible interference from other base stations.

Figure 8:
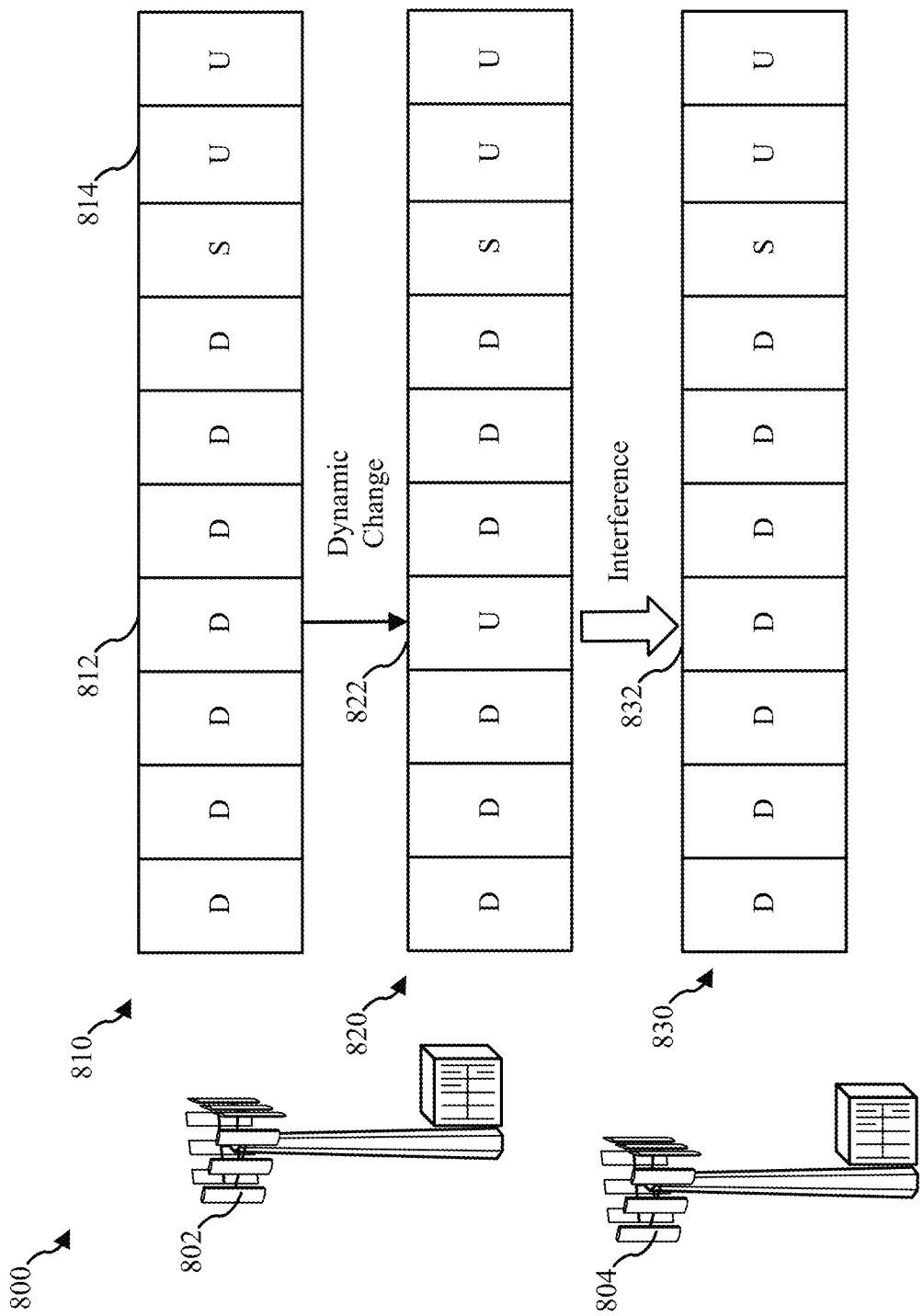
FIG. 8 illustrates an example of a dynamic slot format change.

For example, FIG. 8 is a diagram 800 illustrating an example of a dynamic slot format change. As illustrated in FIG. 8, a base station 802 may be configured with a slot format 810. The base station 802 may determine a need to receive an uplink transmission (e.g., for control information), but the uplink slots 814 of the slot format 810 may be located at an end of the subframe. The base station 802 may dynamically convert a slot 812 of the slot format 810 into an uplink slot to receive the uplink transmission. For instance, the dynamic change may result in a slot format 820 including the uplink slot 822. Such a dynamic change may result in CLI to a downlink transmission of a base station 804 in a slot 832 of a slot format 830.

A similar issue may occur in a system configured with dynamic TDD for full-duplex devices. Switching a slot from DL to UL or a full-duplex slot may lower latency of an uplink transmission, but may also result in interference.

Figure 9:
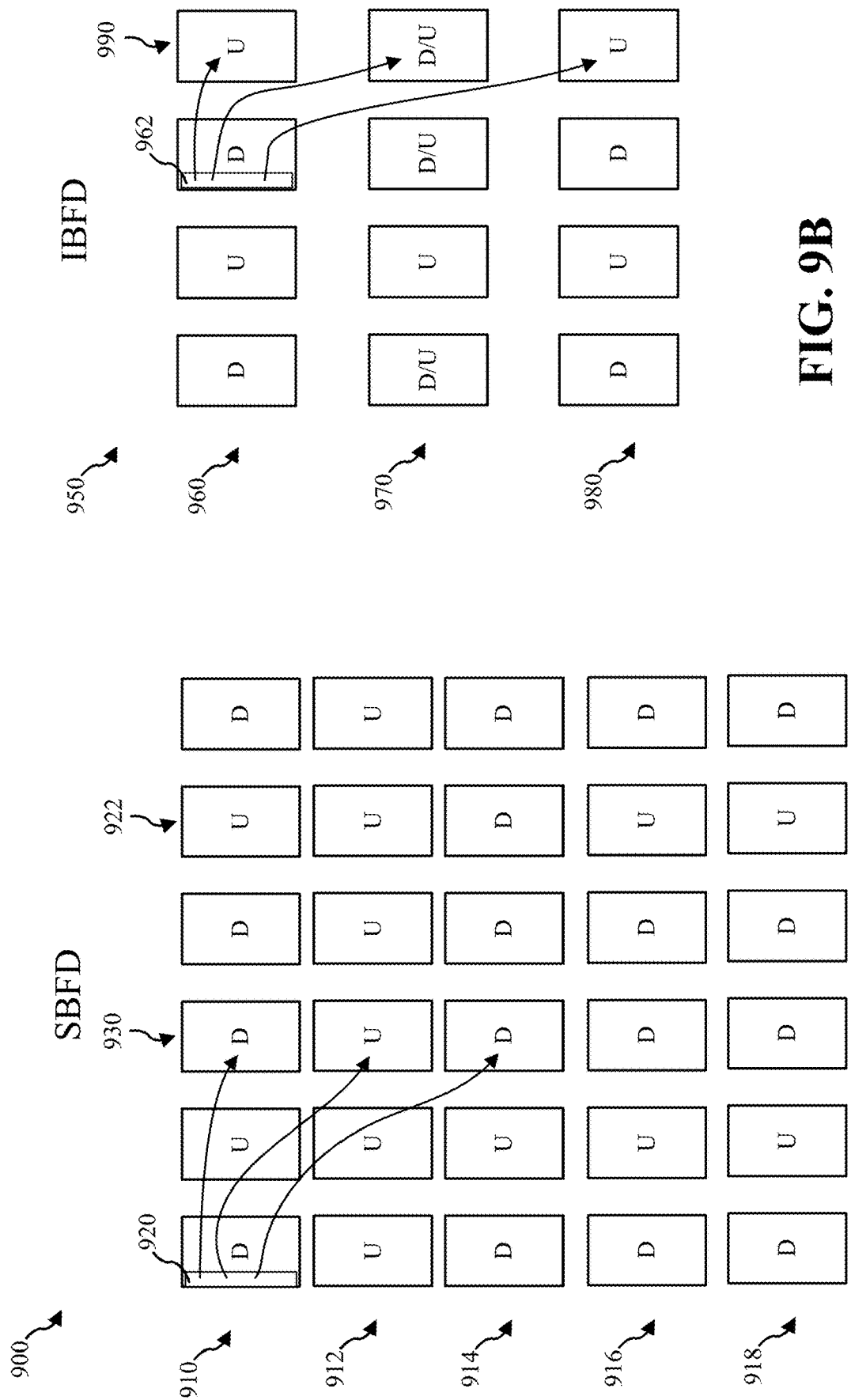
FIG. 9A a diagram of an example of cross-carrier scheduling in a SBFD system.
FIG. 9B is a diagram of an example of cross-carrier scheduling in an IBFD system.

FIG. 9A is a diagram 900 illustrating cross-carrier scheduling in a SBFD system. For example, a UE may be configured with a plurality of cells (e.g., 910, 912, 914, 916, and 918). The base station may schedule the UE on one or more of the plurality of cells by transmitting one or more DCIs 920 on the cell 910. For example, the DCIs 920 may schedule a downlink transmission on the cell 912, an uplink transmission on the cell 914, and a downlink transmission on the cell 916 for a slot 930. In an aspect, the uplink transmission on the cell 914 may cause intra-cell CLI to the downlink transmissions on cells 910 and 916. As another example, in slot 922, the cell 914 may be scheduled for a downlink transmission while the cells 910, 912, 914, and 916 are scheduled for uplink transmissions. The cells 912 and 916 may be adjacent in frequency to the cell 914. Accordingly, the uplink transmissions on the cells 912 and 916 may cause greater intra-cell CLI to the downlink transmissions on cell 914 than the uplink transmissions on the cells 910 and 918. In an aspect, the present disclosure provides for cell-group TPC commands that adjust the transmission power for multiple cells to address such scenarios.

FIG. 9B is a diagram 950 illustrating cross-carrier scheduling in an IBFD system. For example, a UE may be configured with a plurality of cells (e.g., cells 960, 970, 980). The base station may schedule the UE on one or more of the plurality of cells by transmitting one or more DCIs 962 on the cell 960. For example, the DCIs 962 may schedule an uplink transmission on the cell 960, an uplink transmission and a downlink transmission on the cell 970, and an uplink transmission on the cell 980 for the slot 990. In an aspect, any of the uplink transmissions in slot 990 on the cells 960, 970, 980 may cause CLI to the downlink transmission on cell 970. A cell-group TPC command may adjust the transmission power for multiple cells to mitigate such CLI.

Figure 10:
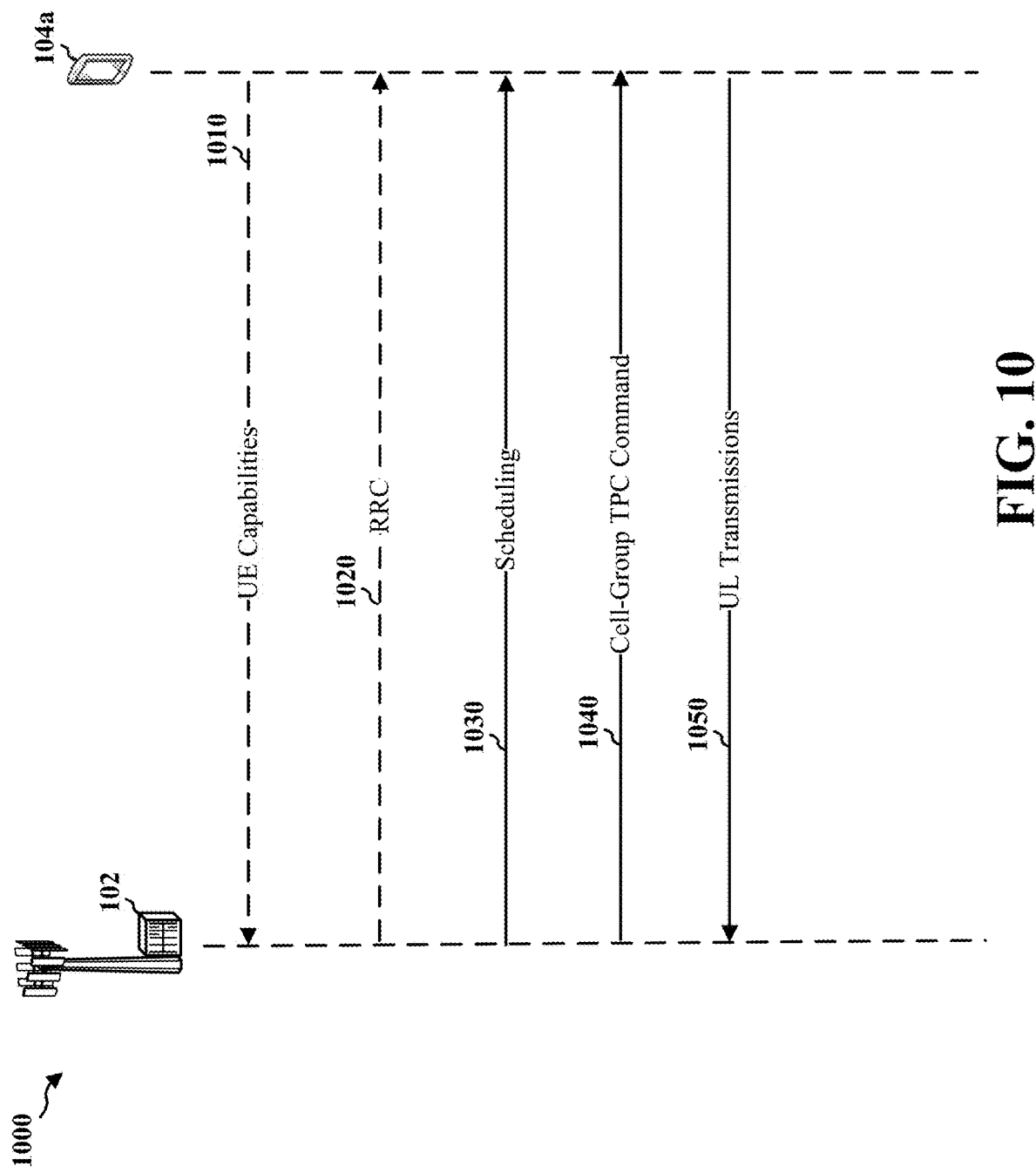
FIG. 10 is a message diagram showing examples of messages between a base station and a UE for controlling transmission power of the UE.

FIG. 10 is a message diagram 1000 showing examples of messages between a base station 102 and a UE 104 for controlling transmission power of the UE 104. The base station 102 may be a serving base station for the UE 104. In an aspect, the UE 104 may be considered an aggressor UE because an uplink transmission by the UE 104 may cause interference to another UE.

The UE 104 may transmit UE capabilities 1010 indicating the capabilities of the UE 104 with respect to cell-group TPC commands. For example, the UE capabilities 1010 may include an indication of a capability to support one or more of: a cell-group TPC command, a cell-group TPC command via unicast DCI, or a cell-group TPC command via group-common DCI.

The base station 102 configure the UE 104 via RRC signaling 1020. For example, the base station 102 may configure the UE 104 with a plurality of cells. The configuration for each cell may include a cell ID. In some implementations, the base station 102 may configure the UE 104 with information for cell-group TPC commands. For example, the RRC signaling 1020 may define a DCI position for each of the plurality of cells, a DCI position for the UE, or a TPC command table, as discussed in further detail below.

The base station 102 may transmit scheduling 1030. The scheduling 1030 may schedule the UE 104 to transit or receive on one or more of the configured cells. In some implementations, the scheduling 1030 may schedule periodic transmissions. For example the scheduling 1030 may include semi-persistent scheduling (SPS) for downlink transmissions or configured grants (CG) for uplink transmissions. In some implementations, the scheduling 1030 may include dynamic grants scheduled by one or more DCIs (e.g., DCIs 920 or 962).

The base station may transmit a cell-group TPC command 1040. The cell-group TPC command 1040 may be a single DCI that indicates a plurality of TPC commands for a plurality of cells configured for the UE. The plurality of cells may include all of the cells configured for the UE or a subset of the cells configured for the UE. For example, the plurality of cells may include configured cells that are scheduled for an uplink transmission. In an aspect, the base station may identify specific cells in the cell-group TPC command 1040, for example, by including a cell-ID for each of the plurality of cells. As another example, the base station may include a TPC command at each of the DCI positions configured for the specific cells.

The UE 104 may transmit UL transmissions 1050 on the plurality of cells. The UL transmissions 1050 may include a PUCCH and/or a PUSCH. The transmission power for the UL transmissions 1050 may be based on the cell-group TPC command 1040. For example, the UE 104 may adjust a transmit power for a respective uplink transmission for each respective cell of the plurality of cells based on a respective TPC command of the cell-group TPC command 1040.

Figure 11:
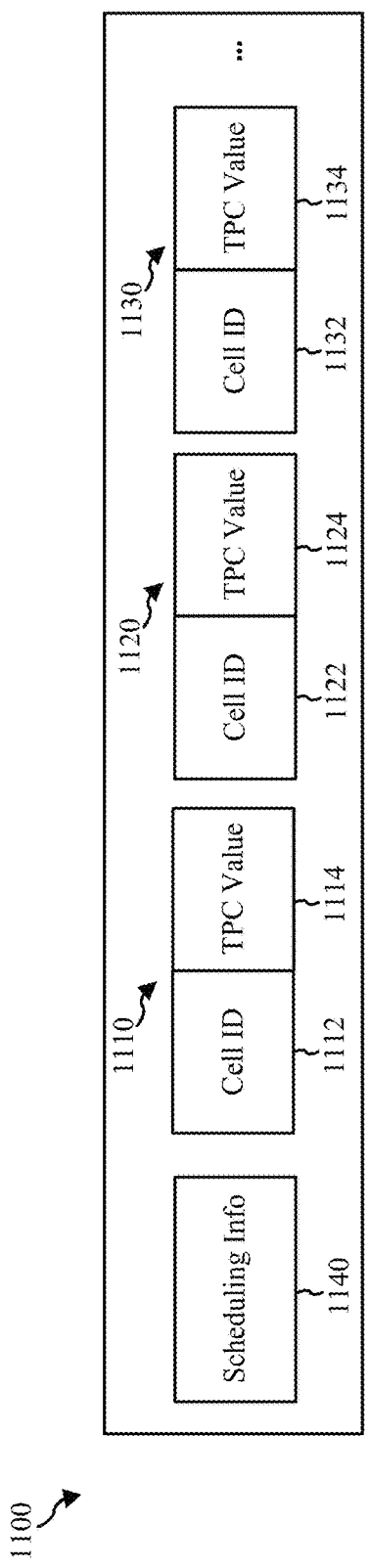
FIG. 11 is a diagram of an example downlink control information (DCI) including pairs of cell identifiers (IDs) and transmit power control (TPC) values.

FIG. 11 is a diagram of an example of a unicast DCI 1100 including a sequence of pairs 1110, 1120, 1130 of a cell identifier and a corresponding TPC value. Each pair 1110, 1120, and 1130 may include a cell ID 1112, 1122, 1132 and a TPC value 1114, 1124, 1134. The cell ID 1112, 1122, 1132 may identify a cell configured for the UE. The TPC value 1114, 1124, 1134 may define a TPC command. For example, the TPC value 1114 may be mapped to a TPC adjustment via a TPC table.

The DCI 1100 may be a DCI for scheduling a PUSCH. The DCI 1100 may have a format 0_x. For instance, the DCI 1100 may re-use a DCI format defined in 3GPP TS 38.212 version 16.0 or earlier. For example, the DCI 1100 may include fields for scheduling info 1140. For example, fields may be defined for a DCI format identifier, carrier indicator, uplink or supplemental uplink indicator, bandwidth part indicator, frequency domain resource assignment, time domain resource assignment, frequency hopping flag, modulation and coding scheme, new data indicator, redundancy version, HARQ process number, first downlink assignment index, second downlink assignment index and SRS resource indicator. The DCI format may include a TPC command for scheduled PUSCH. One or more fields of the DCI format may be interpreted as the sequence of pairs 1110, 1120, 1130. For example, if the DCI is a non-scheduling DCI (e.g., for requesting SRS), some of the fields may not be needed and may instead carry the sequence of pairs 1110, 1120, 1130. In another aspect, the DCI 1100 may use a new format that includes fields allocated for the sequence of pairs 1110, 1120, 1130.

Figure 12:
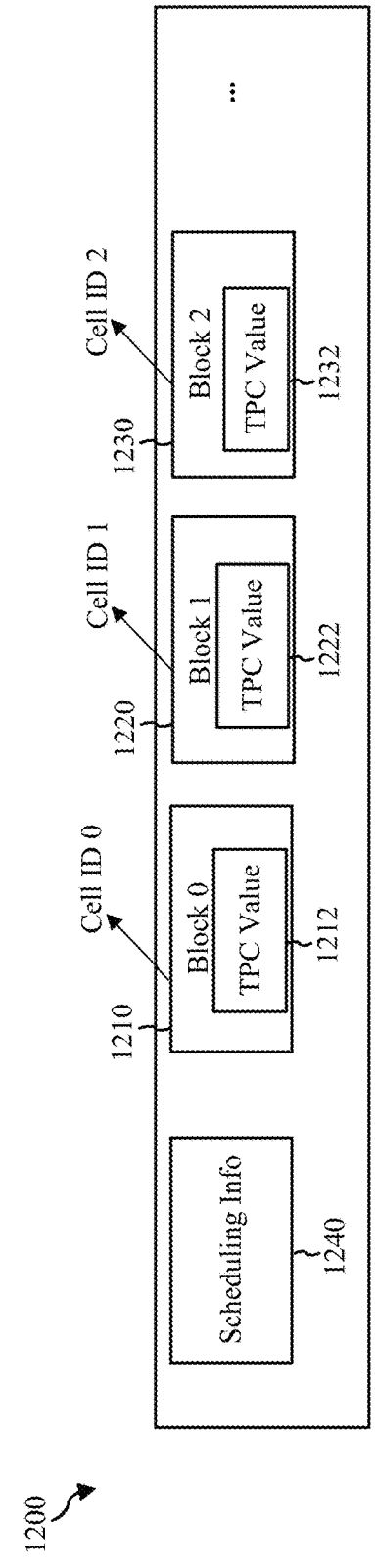
FIG. 12 is a diagram of an example DCI including blocks with TPC values that are mapped to configured cells.

FIG. 12 is a diagram of an example of a unicast DCI 1200 including a plurality of blocks 1210, 1220, 1230 defining a plurality of DCI positions. Each of the plurality of blocks may be mapped to a respective cell of the plurality of cells (e.g., cells 910, 912, 914, 916, 918). For example, the cell configuration for each of the plurality of cells may identify a DCI position that indicates the block for the cell. For instance, cell 0 may be mapped to block 1210, cell 1 may be mapped to block 1220, and cell 2 may be mapped to block 1230. Each of the plurality of blocks 1210, 1220, 1230 may define a TPC value 1212, 1222, 1232 for the respective cell. As discussed above with respect to FIG. 11, the unicast DCI 1200 may also re-use a defined DCI format (e.g., including scheduling info 1240) or use a new format defined to include fields for the plurality of blocks 1210, 1220, 1230.

Figure 13:
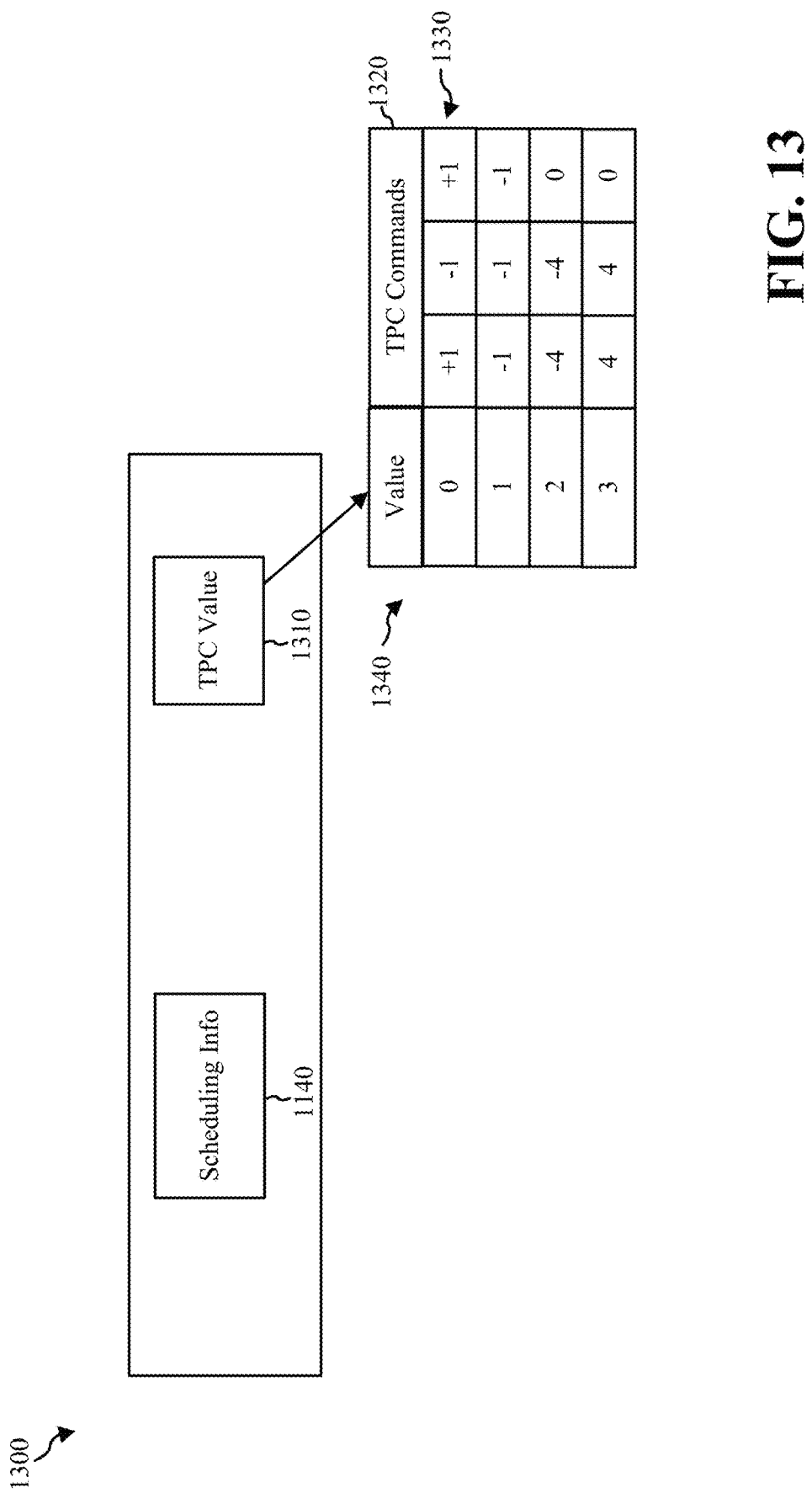
FIG. 13 is a diagram of an example DCI including a single TPC value that is mapped to a sequence of TPC commands.

FIG. 13 is a diagram of an example of a unicast DCI 1300 including a TPC value 1310 that is mapped to a sequence of transmit power adjustments 1330 that each define a TPC command of the plurality of TPC commands 1320. The unicast DCI 1300 may re-use a DCI format that includes scheduling info 1140 and a TPC command field (e.g., DCI formats 0_x). The RRC signaling 1020 may define a TPC table 1340 that maps the TPC value 1310 to one of the sequences of transmit power adjustments 1330.

Figure 14:
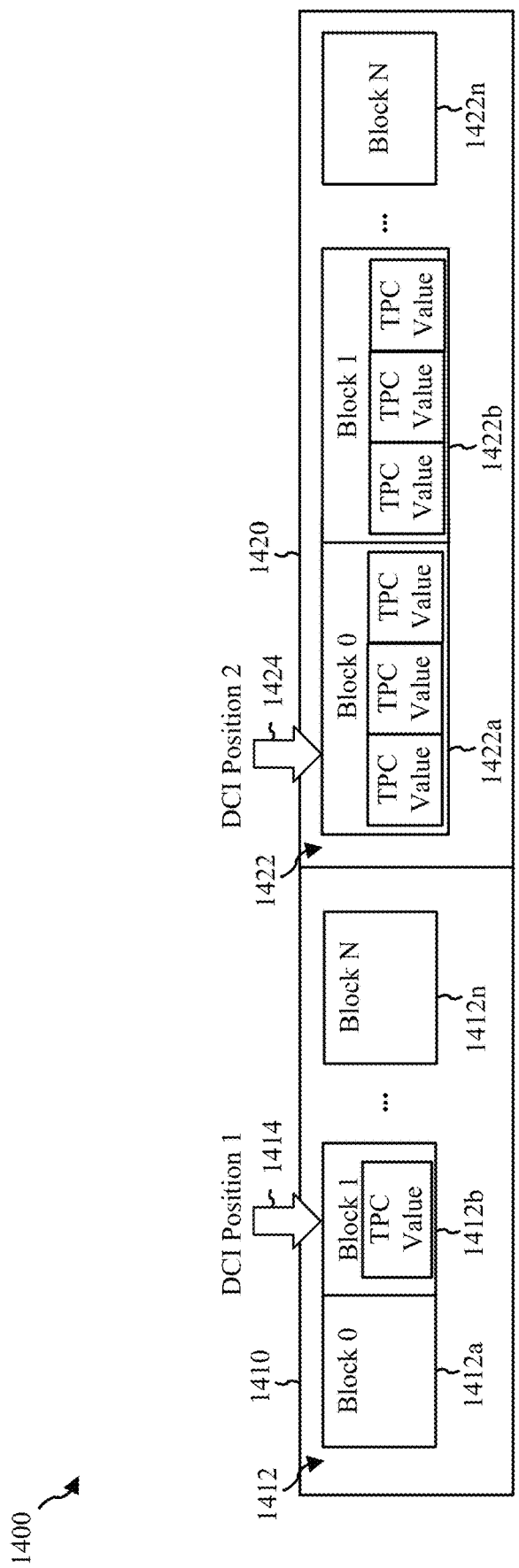
FIG. 14 is a diagram of an example group-common DCI including a sequence of TPC values for at least one UE.

FIG. 14 is a diagram of an example group-common DCI 1400 that indicates a sequence of TPC values for the UE and at least one TPC value for another UE. The group-common DCI 1400 may include a first part 1410 that follows a legacy DCI format and a second part 1420 that defines one or more sequences of TPC commands. The first part 1410 may include one or more blocks 1412 (e.g., blocks 1412a, 1412b, . . . , 1412n). Each block 1412 may indicate a TPC command. Each legacy UE 104 may be configured with a DCI position index 1414 that points to one of the blocks. A legacy UE may determine the TPC value for the TPC command from the block indicated by the DCI position index 1414. In some implementations, a UE with a capability for a cell-group TPC command may be configured to receive multiple TPC commands from the group-common DCI 1400.

In an aspect, the second part 1420 may include one or more blocks 1422 (e.g., blocks 1422a, 1422b, . . . , 1422n). Each block 1422 may include a sequence of TPC values corresponding to the configured cells of a UE. Each UE 104 that is capable of receiving a cell-group TPC command may be configured with a DCI position 1424 corresponding to one of the blocks 1422 in the second part 1420. The UE 104 may determine the sequence of TPC values for the UE based on the DCI position 1424. For example, the UE 104 may map each TPC value in the block 1422a to a TPC command for a configured cell. In an aspect, the RRC signaling 1020 may configure the DCI position 1424 for the UE 104. In some implementations, the RRC signaling 1020 may configure the UE 104 to receive the group-common DCI 1400 on one of the plurality of cells configured for the UE 104.

Figure 15:
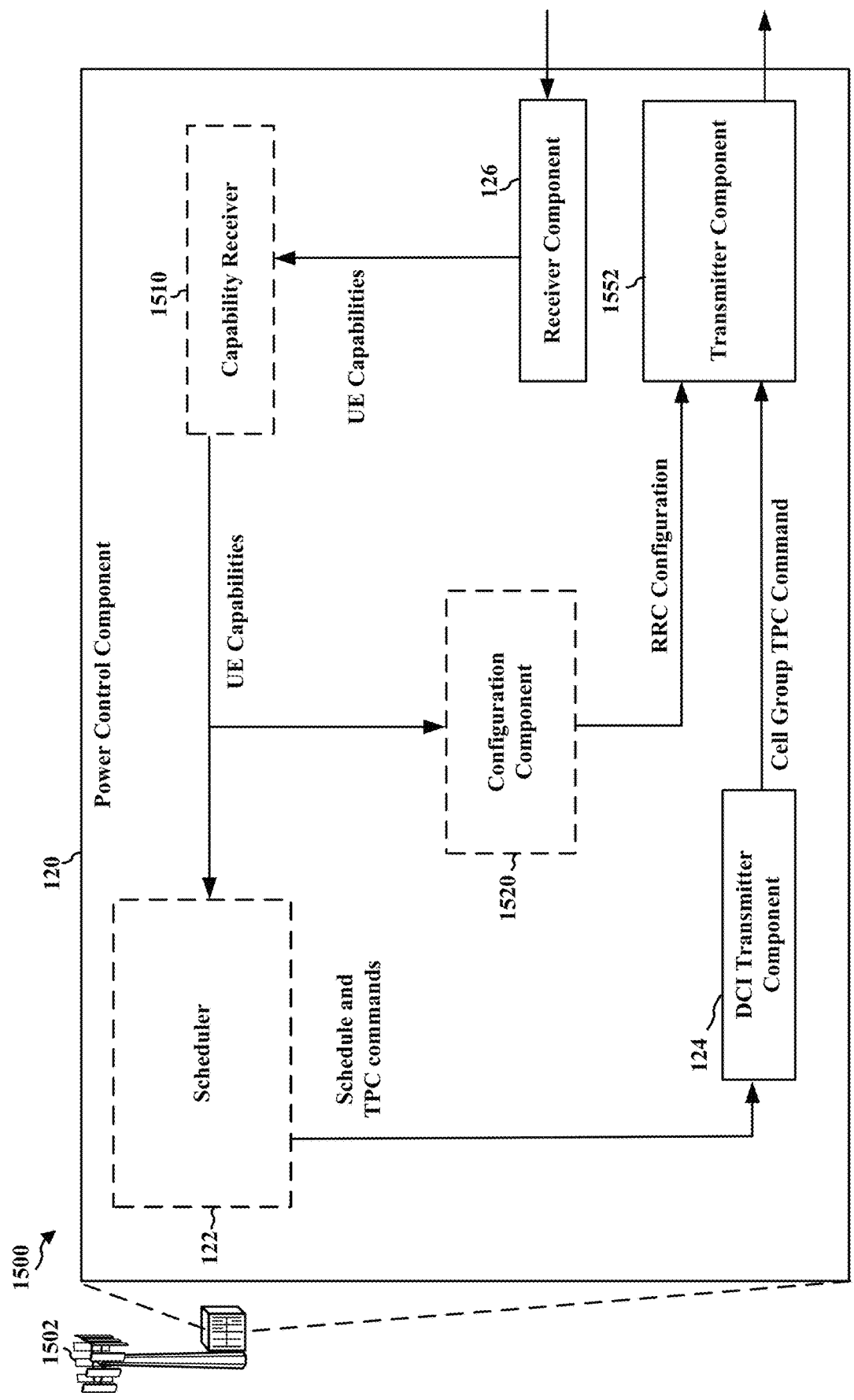
FIG. 15 is a conceptual data flow diagram illustrating the data flow between different means/components in an example BS.

FIG. 15 is a conceptual data flow diagram 1500 illustrating the data flow between different means/components in an example base station 1502, which may be an example of the base station 102 including the power control component 120. The power control component 120 may include the DCI transmitter component 124 and the scheduler 122. In some implementations, the power control component 120 may include a capability receiver 1510 for receiving an indication of UE capabilities 1010 and/or a configuration component 1520 for transmitting an RRC signaling 1020. The power control component 120 also may include a transmitter component 1552.

The receiver component 126 may include, for example, a RF receiver for receiving the signals described herein. The transmitter component 1552 may include for example, an RF transmitter for transmitting the signals described herein. In some implementations, the receiver component 126 and the transmitter component 1552 may be co-located in a transceiver.

The receiver component 126 may receive uplink signals from multiple UEs 104. For example, the receiver component 126 may receive UE capabilities 1010 from a UE. The receiver component 126 may provide the UE capabilities 1010 to the capability receiver 1510.

The capability receiver 1510 may receive one or more indications of UE capabilities 1010. The capability receiver 1510 may determine capabilities of the UE 104 based on the UE capabilities 1010. For example, the capability receiver 1510 may determine whether the UE 104 supports one or more of: a cell-group TPC command, a cell-group TPC command via unicast DCI, or a cell-group TPC command via group-common DCI. The capability receiver 1510 may provide the capabilities of the UE 104 to the configuration component 1520.

The configuration component 1520 may receive UE capabilities from the capability receiver 1510. The configuration component 1520 may determine a configuration of one or more parameters for a cell-group TPC command for the UE 104. For example, the configuration component 1520 may determine one or more configurable fields of a DCI format, a DCI position for the UE, one or more TPC tables mapping between one or more TPC values and the TPC command for each of the plurality of cells, or a cell to transmit a group-common DCI. The configuration component 1520 may transmit an RRC configuration indicating the one or more parameters for the cell-group TPC command to the UE 104.

The scheduler 122 may receive UE capabilities for one or more UEs from the capability receiver 1510. The scheduler 122 may schedule a plurality of transmissions for the UE 104 on the plurality of cells configured for the UE 104. For example, if the UE 104 is capable of SBFD, the scheduler 122 may schedule an uplink transmission or a downlink transmission for each of the configured cells. If the UE 104 is capable of IBFD, the scheduler 122 may schedule an uplink transmission, a downlink transmission, or both on each of the configured cells. In an aspect, the scheduler 122 may determine that uplink transmission power for the scheduled transmissions should be adjusted for transmissions in a scheduled slot. For example, the scheduler 122 may determine to reduce the transmission power for uplink transmissions when the uplink transmissions are likely to cause interference to one or more downlink transmissions in the same slot. The scheduler 122 may provide a schedule and TPC commands to the DCI transmitter component 124.

The DCI transmitter component 124 may receive the schedule and TPC commands from the scheduler 122. The DCI transmitter component 124 may generate a cell group TPC command based on the schedule and TPC commands. For example, the cell group TPC command may be a single DCI such as the unicast DCI 1100, the unicast DCI 1200, the unicast DCI 1300, or the group-common DCI 1400. The DCI transmitter component 124 may transmit the cell group TPC command via the transmitter component 1552

Figure 16:
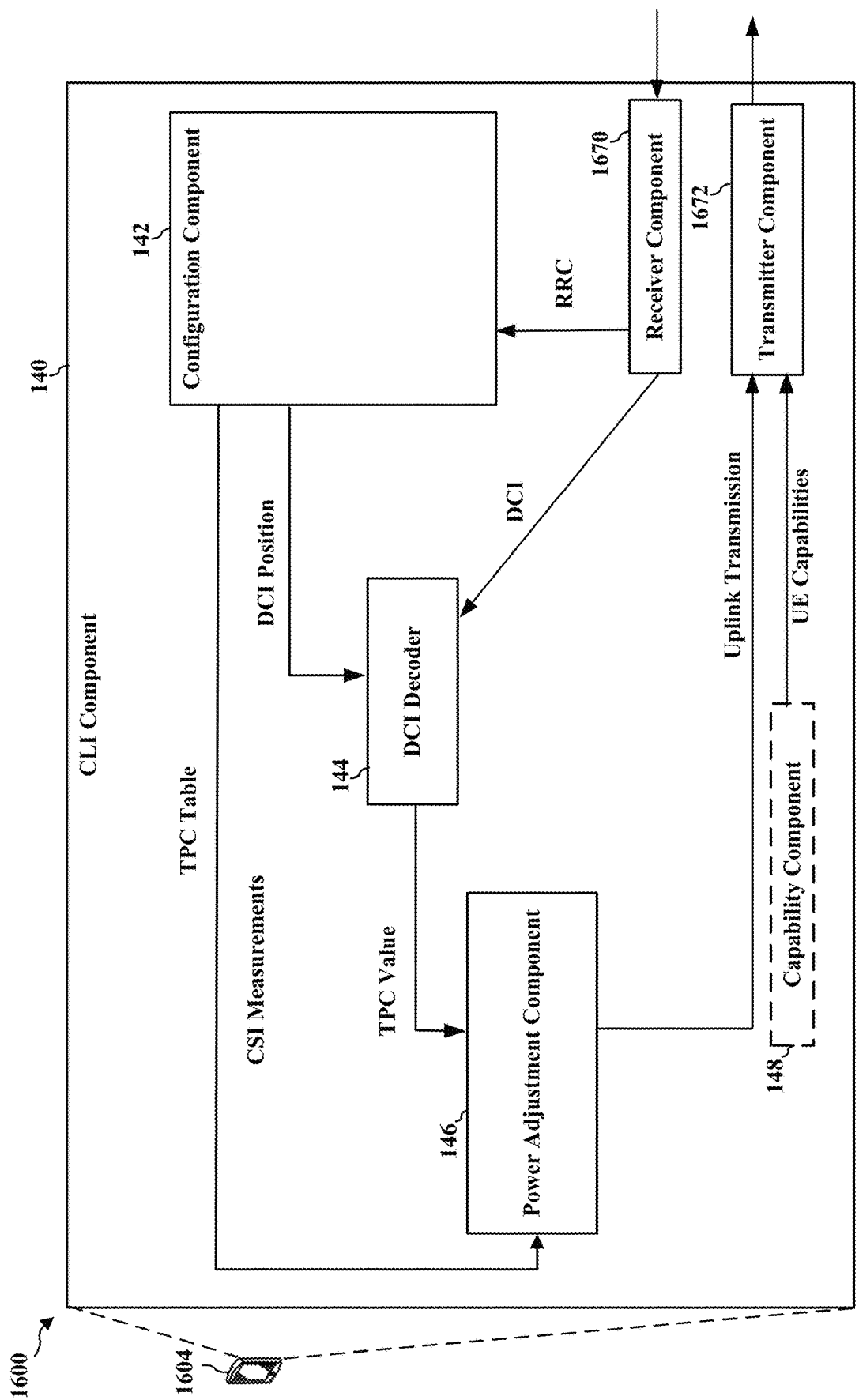
FIG. 16 is a conceptual data flow diagram illustrating the data flow between different means/components in an example UE.

FIG. 16 is a conceptual data flow diagram 1600 illustrating the data flow between different means/components in an example UE 1604, which may be an example of the UE 104 and include the TPC component 140.

As discussed with respect to FIG. 1, the TPC component 140 may include the configuration component 142, the DCI decoder 144, and the power adjustment component 146. In some implementations, the TPC component 140 may include the capability component 148. The TPC component 140 also may include a receiver component 1670 and a transmitter component 1672. The receiver component 1670 may include, for example, a RF receiver for receiving the signals described herein. The transmitter component 1672 may include for example, an RF transmitter for transmitting the signals described herein. In some implementations, the receiver component 1670 and the transmitter component 1672 may be co-located in a transceiver.

The receiver component 1670 may receive downlink signals such as the RRC signaling 1020 or the cell-group TPC command 1040. The receiver component 1670 may provide the RRC signaling 1020 to the configuration component 142. The receiver component 1670 may provide a DCI carrying the cell-group TPC command 1040 to the DCI decoder 144.

The configuration component 142 may receive the RRC signaling 1020 from the receiver component 1670. The configuration component 142 may extract RRC configured parameters from the RRC signaling 1020, for example, by decoding the RRC signaling. For example, the configuration component 142 may extract parameters related to the cell-group TPC command such as one or more configurable fields of a DCI format, a DCI position for the UE, one or more TPC tables mapping between one or more TPC values and the TPC command for each of the plurality of cells, or a cell to receive a group-common DCI. The configuration component 142 may provide the configurable fields of the DCI format and the DCI position for the UE to the DCI decoder 144. The configuration component 142 may provide the TPC table to the power adjustment component 146.

The DCI decoder 144 may receive the DCI position and other parameters from the configuration component 142. The DCI decoder 144 may perform decoding operations on PDCCH candidates that may include a DCI carrying the cell-group TPC command 1040. The DCI decoder 144 may decode the DCI carrying the cell-group TPC command 1040 based on the one or more configurable fields of the DCI format and/or the DCI position for the UE. For example, the DCI decoder 144 may extract one or more TPC values. The DCI decoder 144 may determine one or more cells mapped to each TPC value. For example, if the DCI 1100 is received, the DCI decoder 144 may determine the cell ID paired with each TPC value. As another example, if the DCI 1200 is received, the DCI decoder 144 may determine a cell ID mapped to the block carrying the TPC value. If the DCI 1300 is received, the DCI decoder 144 may determine a single TPC value 1310. If the DCI 1400 is received, the DCI decoder 144 may determine the sequence of TPC values that correspond to the DCI position configured for the UE 1604 and map the TPC values to configured cells for the UE 1604. The DCI decoder 144 may provide the one or more TPC values to the power adjustment component 146.

The power adjustment component 146 may receive the one or more TPC values from the DCI decoder 144. The power adjustment component 146 may receive the TPC table from the configuration component 142. The power adjustment component 146 may determine a transmit power adjustment for each of the plurality of cells based on the one or more TPC values. For example, the power adjustment component 146 may map the TPC value to the transmit power adjustment using a standardized or configured table. For instance, where the cell-group TPC command 1040 includes a TPC value for each cell, the power adjustment component 146 may use the following table to determine an accumulated or absolute power adjustment:

TABLE 1

| TPC Command Field | Accumulated $\delta_{PUSCH, b, f, c}$ or $\delta_{SRS, b, f, c}$ [dB] | Absolute $\delta_{PUSCH, b, f, c}$ or $\delta_{SRS, b, f, c}$ [dB] |
|---|---|---|
| 0 | −1 | −4 |
| 1 | 0 | −1 |
| 2 | 1 | 1 |
| 3 | 3 | 4 |

In another aspect, where the cell-group TPC command 1040 includes a single TPC value (e.g., DCI 1300), the power adjustment component 146 may use the table 1340 to map the TPC value to a sequence of power adjustments. The values illustrated in the table 1340 are an example. Different values may be defined in a standards document or configured via the RRC signaling 1020. The power adjustment component 146 may transmit the uplink transmissions via the transmitter component 1672.

The capability component 148 may transmit an indication of one or more capabilities of the UE 1604 related to cell-group TPC commands as described herein. For example, the capability component 148 may transmit an RRC message indicating whether the UE 1604 is capable of performing any of the actions described herein. Example capabilities that may be reported include support for: a cell-group TPC command, a cell-group TPC command via unicast DCI, or a cell-group TPC command via group-common DCI.

Figure 17:
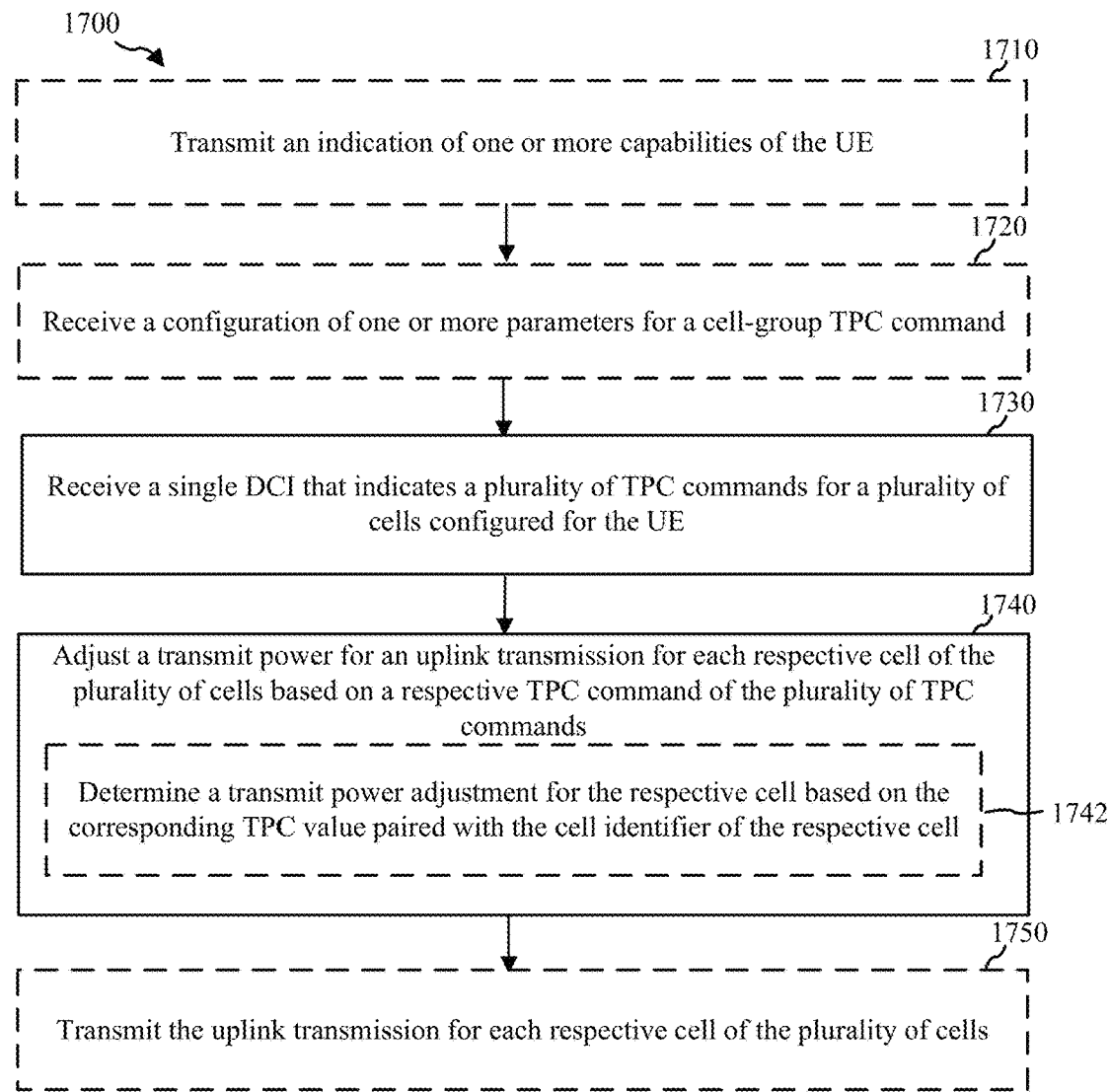
FIG. 17 is a flowchart of an example method of transmission power control for a UE based on a cell-group TPC command.

FIG. 17 is a flowchart of an example method 1700 for a UE to adjust transmission power for a plurality of cells. The method 1700 may be performed by a UE (such as the UE 104, which may include the memory 360 and which may be the entire UE 104 or a component of the UE 104 such as the TPC component 140, TX processor 368, the RX processor 356, or the controller/processor 359). The method 1700 may be performed by the TPC component 140 in communication with the power control component 120 of the base station 102. Optional blocks are shown with dashed lines.

At block 1710, the method 1700 may optionally include transmitting an indication of one or more capabilities of the UE. In some implementations, for example, the UE 104, the TX processor 368, or the controller/processor 359 may execute the TPC component 140 or the capability component 148 to transmit the indication of one or more capabilities of the UE (e.g., UE capabilities 1010). Example capabilities may include whether the UE supports one or more of: a cell-group TPC command, a cell-group TPC command via unicast DCI, or a cell-group TPC command via group-common DCI. Accordingly, the UE 104, the TX processor 368, or the controller/processor 359 executing the TPC component 140 or the capability component 148 may provide means for transmitting an indication of one or more capabilities of the UE.

At block 1720, the method 1700 may include receiving, from a base station, a configuration of one or more parameters for a cell-group TPC command. In some implementations, for example, the UE 104, the RX processor 356, or the controller/processor 359 may execute the TPC component 140 or the configuration component 142 to receive, from the base station 102, the configuration (e.g., RRC signaling 1020) for the one or more parameters for a cell-group TPC command. For example, the RRC signaling 1020 may configure one or more configurable fields of a DCI format. As another example, the RRC signaling 1020 may define the mapping between each configured cell (e.g., cells 910, 912, 914, 916, 918) and a DCI position (e.g., block 1210, 1220, 1230. In another example, the RRC signaling 1020 may define the DCI position 1424 for the UE 104. In another example, the RRC signaling 1020 may indicate the TPC table 1340. Accordingly, the UE 104, the RX processor 356, or the controller/processor 359 executing the TPC component 140 or the configuration component 142 may provide means for receiving, from a base station, a configuration of one or more parameters for a cell-group TPC command.

At block 1730, the method 1700 may include receiving a single DCI that indicates a plurality of TPC commands for a plurality of cells configured for the UE. In some implementations, for example, the UE 104, the RX processor 356, or the controller/processor 359 may execute the TPC component 140 or the DCI decoder 144 to receive the single DCI (e.g., DCI 1100, 1200, 1300, 1400) that indicates a plurality of TPC commands for a plurality of cells (e.g., cells 910, 912, 914, 916, 918) that are configured for the UE 104. The number of TPC commands may be less than the number of configured cells. In an aspect, for example, the DCI 1100 may include a sequence of pairs 1110, 1120, 1130 of a cell identifier 1112, 1122, 1132 and a corresponding TPC value 1114, 1124, 1134. As another example, the DCI 1200 may include a plurality of blocks 1210, 1220, 1230 defining a plurality of DCI positions. Each of the plurality of blocks 1210, 1220, 1230 may be mapped to a respective cell of the plurality of cells (e.g., cells 910, 912, 914, 916, 918) and may define a TPC value 1212, 1222, 1232 for the respective cell. As another example, the DCI 1300 may include a TPC value 1310 that is mapped to a sequence of transmit power adjustments 1330 that defines the plurality of TPC commands 1320. In yet another example, the group-common DCI 1400 may indicate a sequence of TPC values for the UE and at least one TPC value for another UE. Each of the TPC values for the UE 104 is mapped to one of the plurality of cells (e.g., cells 910, 912, 914, 916, 918) configured for the UE. Accordingly, the UE 104, the RX processor 356, or the controller/processor 359 executing the TPC component 140 or the DCI decoder 144 may provide means for receiving a single DCI that indicates a plurality of TPC commands for a plurality of cells configured for the UE.

At block 1740, the method 1700 may include adjusting a transmit power for an uplink transmission for each respective cell of the plurality of cells based on a respective TPC command of the plurality of TPC commands. In some implementations, for example, the UE 104, the TX processor 368, or the controller/processor 359 may execute the TPC component 140 or the power adjustment component 146 to adjust the transmit power for the uplink transmission for each respective cell of the plurality of cells (e.g., cells 910, 912, 914, 916, 918) based on the respective TPC command of the plurality of TPC commands. In sub-block 1742, the block 1740 may optionally include determining the transmit power adjustment for the respective cell based on the corresponding TPC value 1114 paired with the cell identifier 1112 of the respective cell. In some implementations, determining the transmit power adjustment for a respective cell may be based on a TPC value that is mapped to the respective cell. In view of the foregoing, the UE 104, the TX processor 368, or the controller/processor 359 executing the TPC component 140 or the power adjustment component 146 may provide means for adjusting a transmit power for an uplink transmission for each respective cell of the plurality of cells based on a respective TPC command of the plurality of TPC commands.

At block 1750, the method 1700 may optionally include transmitting the uplink transmission for each respective cell of the plurality of cells. In some implementations, for example, the UE 104, the TX processor 368, or the controller/processor 359 may execute the TPC component 140 or the transmitter component 1672 to transmit the uplink transmission for each respective cell of the plurality of cells. The uplink transmission may include a PUCCH and/or a PUSCH. Accordingly, the UE 104, the TX processor 368, or the controller/processor 359 executing the TPC component 140 or the transmitter component 1672 may provide means for transmitting the uplink transmission for each respective cell of the plurality of cells.

Figure 18:
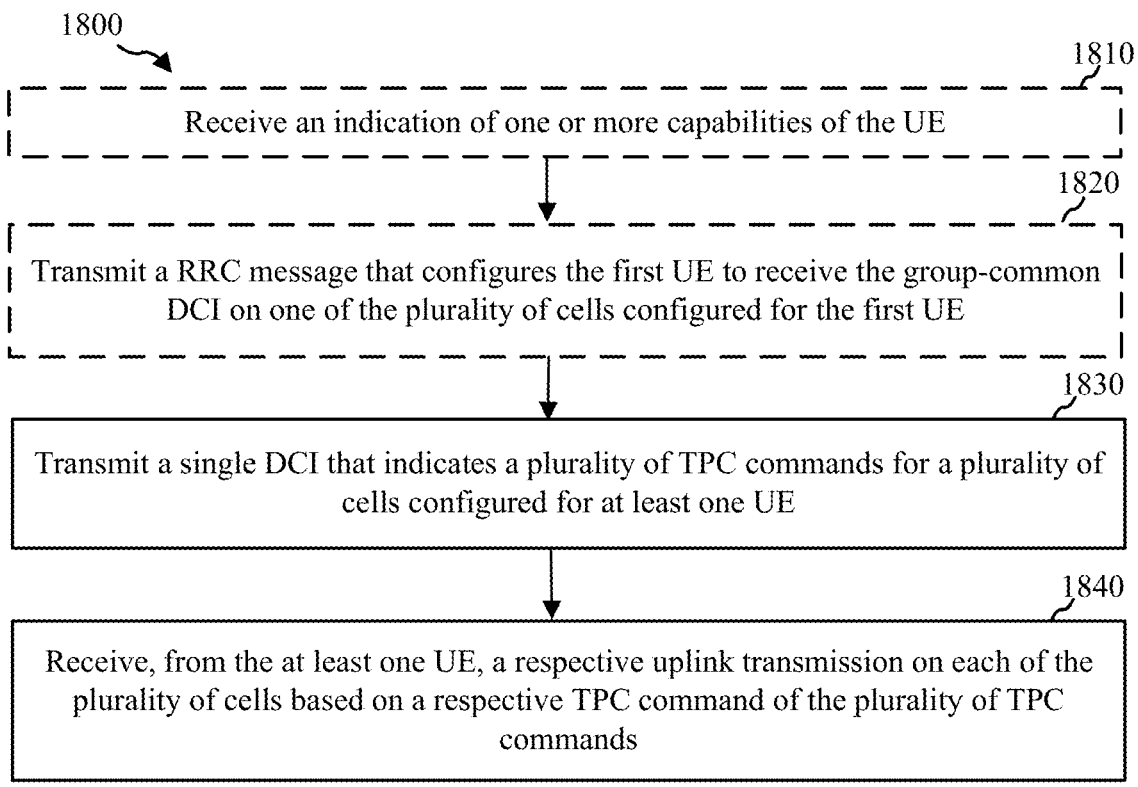
FIG. 18 is a flowchart of an example method of a base station for controlling transmission power of a UE using a cell-group TPC command.

FIG. 18 a flowchart of an example method 1800 for a base station to transmit a cell-group TPC command. The method 1800 may be performed by a base station (such as the base station 102, which may include the memory 376 and which may be the entire base station 102 or a component of the base station 102 such as the power control component 120, TX processor 316, the RX processor 370, or the controller/processor 375). The method 1800 may be performed by the power control component 120 in communication with the TPC component 140 of the UE 104.

At block 1810, the method 1800 may optionally include receiving an indication of one or more capabilities of a UE. In some implementations, for example, the base station 102, RX processor 370, or the controller/processor 375 may execute the power control component 120 or the capability receiver 1510 to receive an indication of one or more capabilities of the UE. For example, the indication may be an indication of a capability of the UE to support one or more of: a cell-group TPC command, a cell-group TPC command via unicast DCI, or a cell-group TPC command via group-common DCI. Accordingly, the base station 102, RX processor 370, or the controller/processor 375 executing the power control component 120 or the capability receiver 1510 may provide means for receiving an indication of one or more capabilities of the UE.

At block 1820, the method 1800 may include transmitting a RRC message that configures the first UE to receive the group-common DCI on one of the plurality of cells configured for the first UE. In some implementations, for example, the base station 102, TX processor 316, or the controller/processor 375 may execute the power control component 120 or the configuration component 1520 to transmit a RRC message (e.g., RRC signaling 1020) that configures the first UE to receive the group-common DCI on one of the plurality of cells configured for the first UE. Accordingly, the base station 102, TX processor 316, or the controller/processor 375 executing the power control component 120 or the configuration component 1520 may provide means for transmitting a RRC message that configures the first UE to receive the group-common DCI on one of the plurality of cells configured for the first UE.

At block 1830, the method 1800 may include transmitting a single DCI that indicates a plurality of TPC commands for a plurality of cells configured for at least one UE. In some implementations, for example, the base station 102, TX processor 316, or the controller/processor 375 may execute the power control component 120 or the DCI transmitter component 124 to transmit a single DCI that indicates a plurality of TPC commands for a plurality of cells configured for at least one UE. Accordingly, the base station 102, TX processor 316, or the controller/processor 375 executing the power control component 120 or the DCI transmitter component 124 may provide means for transmitting a single DCI that indicates a plurality of TPC commands for a plurality of cells configured for at least one UE.

At block 1840, the method 1800 may include receiving, from the at least one UE, a respective uplink transmission on each of the plurality of cells based on a respective TPC command of the plurality of TPC commands. In some implementations, for example, the base station 102, RX processor 370, or the controller/processor 375 may execute the power control component 120 or the receiver component 126 to receive, from the at least one UE, a respective uplink transmission on each of the plurality of cells based on a respective TPC command of the plurality of TPC commands. Accordingly, the base station 102, RX processor 370, or the controller/processor 375 executing the power control component 120 or the receiver component 126 may provide means for receiving, from the at least one UE, a respective uplink transmission on each of the plurality of cells based on a respective TPC command of the plurality of TPC commands.

SOME FURTHER EXAMPLE CLAUSES

Implementation examples are described in the following numbered clauses:

1. A method of wireless communication, comprising, at a user equipment (UE):

receiving a single downlink control information (DCI) that indicates a plurality of transmission power control (TPC) commands for a plurality of cells that are configured for the UE; and adjusting a transmit power for a respective uplink transmission for each respective cell of the plurality of cells based on a respective TPC command of the plurality of TPC commands.

2. The method of clause 1, wherein the single DCI is a unicast DCI.

3. The method of clause 2, wherein the unicast DCI includes a sequence of pairs of a cell identifier and a corresponding TPC value.

4. The method of clause 3, wherein adjusting the transmit power for a respective cell of the plurality of cells includes determining a transmit power adjustment for the respective cell based on the corresponding TPC value paired with the cell identifier of the respective cell.

5. The method of clause 2, wherein the unicast DCI includes a plurality of blocks defining a plurality of DCI positions, each of the plurality of blocks is mapped to a respective cell of the plurality of cells and defines a TPC value for the respective cell.

6. The method of clause 2, wherein the unicast DCI includes a TPC value that is mapped to a sequence of transmit power adjustments that defines the plurality of TPC commands.

7. The method of clause 2, wherein the unicast DCI is a non-scheduling DCI and one or more scheduling fields of the non-scheduling DCI are interpreted as the plurality of TPC commands.

8. The method of clause 1, wherein the single DCI is a group-common DCI indicating a sequence of TPC values for the UE and at least one TPC value for another UE, and wherein each of the TPC values for the UE is mapped to one of the plurality of cells configured for the UE.

9. The method of clause 8, wherein the group-common DCI includes a first part defining a single TPC command for one or more other UEs, and a second part defining the sequence of TPC values for at least the UE.

10. The method of clause 8, wherein the UE is configured with a DCI position for monitoring for the sequence of TPC values for the UE.

11. The method of clause 8, wherein the UE is configured to receive the group-common DCI on one of the plurality of cells configured for the UE.

12. The method of any of clauses 1-11, wherein the single DCI indicates the plurality of TPC commands based on one or more TPC values that are mapped to a table of transmit power adjustments for cell-group TPC.

13. The method of clause 1, wherein the single DCI includes a single TPC value for the plurality of TPC commands and wherein the plurality of cells configured for the UE to which the plurality of TPC commands are applicable includes cells that are configured with an uplink slot and adjacent in frequency to one or more cells configured with a concurrent downlink slot.

14. The method of clause 1, wherein the single DCI includes a single TPC value and the UE is configured with a mapping between the single TPC value and the TPC command for each of the plurality of cells.

15. The method of any of clauses 1-14, further comprising transmitting an indication of a capability to support one or more of: a cell-group TPC command, a cell-group TPC command via unicast DCI, or a cell-group TPC command via group-common DCI.

16. A method of wireless communication, comprising, at a base station:

transmitting a single downlink control information (DCI) that indicates a plurality of transmission power control (TPC) commands for a plurality of cells configured for at least one user equipment (UE); and receiving, from the at least one UE, a respective uplink transmission on each of the plurality of cells based on a respective TPC command of the plurality of TPC commands.

17. The method of clause 16, wherein the single DCI is a unicast DCI.

18. The method of clause 17, wherein the unicast DCI includes a sequence of pairs of a cell identifier and a corresponding TPC value.

19. The method of clause 17, wherein the unicast DCI includes a plurality of blocks defining a plurality of DCI positions, each of the plurality of blocks is mapped to a respective cell of the plurality of cells and defines a TPC value for the respective cell.

20. The method of clause 17, wherein the unicast DCI includes a TPC value that is mapped to a sequence of transmit power adjustments that define the plurality of TPC commands.

21. The method of clause 17, wherein the unicast DCI is a non-scheduling DCI and one or more scheduling fields of the non-scheduling DCI are interpreted as the plurality of TPC commands.

22. The method of clause 16, wherein the single DCI is a group-common DCI including a sequence of TPC values for a first UE of the at least one UE and at least one sequence of TPC values for a second UE of the at least one UE, and wherein each of the TPC values for the first UE is mapped to one of the configured cells for the first UE.

23. The method of clause 22, wherein the group-common DCI includes a first part defining a single TPC command for one or more other UEs, and a second part defining the sequence of TPC values for the first UE.

24. The method of clause 22, further comprising transmitting a radio resource control (RRC) message that configures the first UE to receive the group-common DCI on one of the plurality of cells configured for the first UE.

25. The method of clause 16, wherein the plurality of cells includes cells that are configured with an uplink slot and adjacent in frequency to one or more cells configured with a concurrent downlink slot.

26. The method of any of clauses 16-25, wherein the single DCI indicates the plurality of TPC commands based on one or more TPC values that are mapped to a table of transmit power adjustments for cell-group TPC.

27. The method of clause 16, wherein the single DCI includes a single TPC value for the UE and the UE is configured with a mapping between the single TPC value and the TPC command for each of the plurality of cells.

28. The method of any of clauses 16-27, further comprising receiving an indication of a capability of the UE to support one or more of: a cell-group TPC command, a cell-group TPC command via unicast DCI, or a cell-group TPC command via group-common DCI.

29. An apparatus of a user equipment (UE) for wireless communication, comprising:

a memory storing computer-executable instructions; and
at least one processor coupled with the memory and configured to execute the instructions to:
receive a single downlink control information (DCI) that indicates a plurality of transmission power control (TPC) commands for a plurality of cells that are configured for the UE; and adjust a transmit power for a respective uplink transmission for each respective cell of the plurality of cells based on a respective TPC command of the plurality of TPC commands.

30. The apparatus of clause 29, wherein the single DCI is a unicast DCI.

31. The apparatus of clause 30, wherein the unicast DCI includes a sequence of pairs of a cell identifier and a corresponding TPC value.

32. The apparatus of clause 31, wherein the at least one processor is configured to determine a transmit power adjustment for the respective cell based on the corresponding TPC value paired with the cell identifier of the respective cell.

33. The apparatus of clause 30, wherein the unicast DCI includes a plurality of blocks defining a plurality of DCI positions, each of the plurality of blocks is mapped to a respective cell of the plurality of cells and defines a TPC value for the respective cell.

34. The apparatus of clause 30, wherein the unicast DCI includes a TPC value that is mapped to a sequence of transmit power adjustments that defines the plurality of TPC commands.

35. The apparatus of clause 30, wherein the unicast DCI is a non-scheduling DCI and one or more scheduling fields of the non-scheduling DCI are interpreted as the plurality of TPC commands.

36. The apparatus of clause 29, wherein the single DCI is a group-common DCI indicating a sequence of TPC values for the UE and at least one TPC value for another UE, and wherein each of the TPC values for the UE is mapped to one of the plurality of cells configured for the UE.

37. The apparatus of clause 36, wherein the group-common DCI includes a first part defining a single TPC command for one or more other UEs, and a second part defining the sequence of TPC values for at least the UE.

38. The apparatus of clause 36, wherein the UE is configured with a DCI position for monitoring for the sequence of TPC values for the UE.

39. The apparatus of clause 36, wherein the UE is configured to receive the group-common DCI on one of the plurality of cells configured for the UE.

40. The apparatus of any of clauses 29-39, wherein the single DCI indicates the plurality of TPC commands based on one or more TPC values that are mapped to a table of transmit power adjustments for cell-group TPC.

41. The apparatus of clause 29, wherein the single DCI includes a single TPC value for the plurality of TPC commands and wherein the plurality of cells configured for the UE to which the plurality of TPC commands are applicable includes cells that are configured with an uplink slot and adjacent in frequency to one or more cells configured with a concurrent downlink slot.

42. The apparatus of clause 29, wherein the single DCI includes a single TPC value and the UE is configured with a mapping between the single TPC value and the TPC command for each of the plurality of cells.

43. The apparatus of any of clauses 29-42, wherein the at least one processor is configured to transmit an indication of a capability to support one or more of: a cell-group TPC command, a cell-group TPC command via unicast DCI, or a cell-group TPC command via group-common DCI.

44. An apparatus of a base station for wireless communication, comprising:

a memory storing computer-executable instructions; and
at least one processor coupled to the memory and configured to execute the instructions to:
transmit a single downlink control information (DCI) that indicates a plurality of transmission power control (TPC) commands for a plurality of cells configured for at least one user equipment (UE); and
receive, from the at least one UE, a respective uplink transmission on each of the plurality of cells based on a respective TPC command of the plurality of TPC commands.

45. The apparatus of clause 44, wherein the single DCI is a unicast DCI.

46. The apparatus of clause 45, wherein the unicast DCI includes a sequence of pairs of a cell identifier and a corresponding TPC value.

47. The apparatus of clause 45, wherein the unicast DCI includes a plurality of blocks defining a plurality of DCI positions, each of the plurality of blocks is mapped to a respective cell of the plurality of cells and defines a TPC value for the respective cell.

48. The apparatus of clause 45, wherein the unicast DCI includes a TPC value that is mapped to a sequence of transmit power adjustments that define the plurality of TPC commands.

49. The apparatus of clause 45, wherein the unicast DCI is a non-scheduling DCI and one or more scheduling fields of the non-scheduling DCI are interpreted as the plurality of TPC commands.

50. The apparatus of clause 44, wherein the single DCI is a group-common DCI including a sequence of TPC values for a first UE of the at least one UE and at least one sequence of TPC values for a second UE of the at least one UE, and wherein each of the TPC values for the first UE is mapped to one of the configured cells for the first UE.

51. The apparatus of clause 50, wherein the group-common DCI includes a first part defining a single TPC command for one or more other UEs, and a second part defining the sequence of TPC values for the first UE.

52. The apparatus of clause 50, wherein the at least one processor is configured to transmit a radio resource control (RRC) message that configures the first UE to receive the group-common DCI on one of the plurality of cells configured for the first UE.

53. The apparatus of clause 44, wherein the plurality of cells includes cells that are configured with an uplink slot and adjacent in frequency to one or more cells configured with a concurrent downlink slot.

54. The apparatus of any of clauses 44-53, wherein the single DCI indicates the plurality of TPC commands based on one or more TPC values that are mapped to a table of transmit power adjustments for cell-group TPC.

55. The apparatus of clause 44, wherein the single DCI includes a single TPC value for the UE and the UE is configured with a mapping between the single TPC value and the TPC command for each of the plurality of cells.

56. The apparatus of any of clauses 44-55, wherein the at least one processor is configured to receive an indication of a capability of the UE to support one or more of: a cell-group TPC command, a cell-group TPC command via unicast DCI, or a cell-group TPC command via group-common DCI.

57. An apparatus of a user equipment (UE) for wireless communication, comprising:

means for receiving a single downlink control information (DCI) that indicates a plurality of transmission power control (TPC) commands for a plurality of cells that are configured for the UE; and means for adjusting a transmit power for a respective uplink transmission for each respective cell of the plurality of cells based on a respective TPC command of the plurality of TPC commands.

58. The apparatus of clause 57, wherein the single DCI is a unicast DCI.

59. The apparatus of clause 58, wherein the unicast DCI includes a sequence of pairs of a cell identifier and a corresponding TPC value.

60. The apparatus of clause 59, wherein the means for adjusting the transmit power for a respective cell of the plurality of cells is configured to determine a transmit power adjustment for the respective cell based on the corresponding TPC value paired with the cell identifier of the respective cell.

61. The apparatus of clause 58, wherein the unicast DCI includes a plurality of blocks defining a plurality of DCI positions, each of the plurality of blocks is mapped to a respective cell of the plurality of cells and defines a TPC value for the respective cell.

62. The apparatus of clause 58, wherein the unicast DCI includes a TPC value that is mapped to a sequence of transmit power adjustments that defines the plurality of TPC commands.

63. The apparatus of clause 58, wherein the unicast DCI is a non-scheduling DCI and one or more scheduling fields of the non-scheduling DCI are interpreted as the plurality of TPC commands.

64. The apparatus of clause 57, wherein the single DCI is a group-common DCI indicating a sequence of TPC values for the UE and at least one TPC value for another UE, and wherein each of the TPC values for the UE is mapped to one of the plurality of cells configured for the UE.

65. The apparatus of clause 64, wherein the group-common DCI includes a first part defining a single TPC command for one or more other UEs, and a second part defining the sequence of TPC values for at least the UE.

66. The apparatus of clause 64, wherein the UE is configured with a DCI position for monitoring for the sequence of TPC values for the UE.

67. The apparatus of clause 64, wherein the UE is configured to receive the group-common DCI on one of the plurality of cells configured for the UE.

68. The apparatus of clause any of clauses 57-67, wherein the single DCI indicates the plurality of TPC commands based on one or more TPC values that are mapped to a table of transmit power adjustments for cell-group TPC.

69. The apparatus of clause 57, wherein the single DCI includes a single TPC value for the plurality of TPC commands and wherein the plurality of cells configured for the UE to which the plurality of TPC commands are applicable includes cells that are configured with an uplink slot and adjacent in frequency to one or more cells configured with a concurrent downlink slot.

70. The apparatus of clause 57, wherein the single DCI includes a single TPC value and the UE is configured with a mapping between the single TPC value and the TPC command for each of the plurality of cells.

71. The apparatus of any of clauses 57-70, further comprising means for transmitting an indication of a capability to support one or more of: a cell-group TPC command, a cell-group TPC command via unicast DCI, or a cell-group TPC command via group-common DCI.

72. An apparatus of a base station for wireless communication, comprising:

means for transmitting a single downlink control information (DCI) that indicates a plurality of transmission power control (TPC) commands for a plurality of cells configured for at least one user equipment (UE); and means for receiving, from the at least one UE, a respective uplink transmission on each of the plurality of cells based on a respective TPC command of the plurality of TPC commands.

73. The apparatus of clause 72, wherein the single DCI is a unicast DCI.

74. The apparatus of clause 73, wherein the unicast DCI includes a sequence of pairs of a cell identifier and a corresponding TPC value.

75. The apparatus of clause 73, wherein the unicast DCI includes a plurality of blocks defining a plurality of DCI positions, each of the plurality of blocks is mapped to a respective cell of the plurality of cells and defines a TPC value for the respective cell.

76. The apparatus of clause 73, wherein the unicast DCI includes a TPC value that is mapped to a sequence of transmit power adjustments that define the plurality of TPC commands.

77. The apparatus of clause 73, wherein the unicast DCI is a non-scheduling DCI and one or more scheduling fields of the non-scheduling DCI are interpreted as the plurality of TPC commands.

78. The apparatus of clause 72, wherein the single DCI is a group-common DCI including a sequence of TPC values for a first UE of the at least one UE and at least one sequence of TPC values for a second UE of the at least one UE, and wherein each of the TPC values for the first UE is mapped to one of the configured cells for the first UE.

79. The apparatus of clause 78, wherein the group-common DCI includes a first part defining a single TPC command for one or more other UEs, and a second part defining the sequence of TPC values for the first UE.

80. The apparatus of clause 78, further comprising means for transmitting a radio resource control (RRC) message that configures the first UE to receive the group-common DCI on one of the plurality of cells configured for the first UE.

81. The apparatus of clause 72, wherein the plurality of cells includes cells that are configured with an uplink slot and adjacent in frequency to one or more cells configured with a concurrent downlink slot.

82. The apparatus of any of clauses 72-81, wherein the single DCI indicates the plurality of TPC commands based on one or more TPC values that are mapped to a table of transmit power adjustments for cell-group TPC.

83. The apparatus of clause 72, wherein the single DCI includes a single TPC value for the UE and the UE is configured with a mapping between the single TPC value and the TPC command for each of the plurality of cells.

84. The apparatus of any of clauses 72-83, further comprising means for receiving an indication of a capability of the UE to support one or more of: a cell-group TPC command, a cell-group TPC command via unicast DCI, or a cell-group TPC command via group-common DCI.

85. A non-transitory computer-readable medium storing computer executable code, the code when executed by a processor of a user equipment (UE) instructs the processor to:

receive a single downlink control information (DCI) that indicates a plurality of transmission power control (TPC) commands for a plurality of cells that are configured for the UE; and adjust a transmit power for a respective uplink transmission for each respective cell of the plurality of cells based on a respective TPC command of the plurality of TPC commands.

86. The non-transitory computer-readable medium of clause 85, wherein the single DCI is a unicast DCI.

87. The non-transitory computer-readable medium of clause 86, wherein the unicast DCI includes a sequence of pairs of a cell identifier and a corresponding TPC value.

88. The non-transitory computer-readable medium of clause 87, wherein the code to adjust the transmit power for a respective cell of the plurality of cells includes code to determine a transmit power adjustment for the respective cell based on the corresponding TPC value paired with the cell identifier of the respective cell.

89. The non-transitory computer-readable medium of clause 86, wherein the unicast DCI includes a plurality of blocks defining a plurality of DCI positions, each of the plurality of blocks is mapped to a respective cell of the plurality of cells and defines a TPC value for the respective cell.

90. The non-transitory computer-readable medium of clause 86, wherein the unicast DCI includes a TPC value that is mapped to a sequence of transmit power adjustments that defines the plurality of TPC commands.

91. The non-transitory computer-readable medium of clause 86, wherein the unicast DCI is a non-scheduling DCI and one or more scheduling fields of the non-scheduling DCI are interpreted as the plurality of TPC commands.

92. The non-transitory computer-readable medium of clause 85, wherein the single DCI is a group-common DCI indicating a sequence of TPC values for the UE and at least one TPC value for another UE, and wherein each of the TPC values for the UE is mapped to one of the plurality of cells configured for the UE.

93. The non-transitory computer-readable medium of clause 92, wherein the group-common DCI includes a first part defining a single TPC command for one or more other UEs, and a second part defining the sequence of TPC values for at least the UE.

94. The non-transitory computer-readable medium of clause 92, wherein the UE is configured with a DCI position for monitoring for the sequence of TPC values for the UE.

95. The non-transitory computer-readable medium of clause 92, wherein the UE is configured to receive the group-common DCI on one of the plurality of cells configured for the UE.

96. The non-transitory computer-readable medium of any of clauses 85-95, wherein the single DCI indicates the plurality of TPC commands based on one or more TPC values that are mapped to a table of transmit power adjustments for cell-group TPC.

97. The non-transitory computer-readable medium of clause 85, wherein the single DCI includes a single TPC value for the plurality of TPC commands and wherein the plurality of cells configured for the UE to which the plurality of TPC commands are applicable includes cells that are configured with an uplink slot and adjacent in frequency to one or more cells configured with a concurrent downlink slot.

98. The non-transitory computer-readable medium of clause 85, wherein the single DCI includes a single TPC value and the UE is configured with a mapping between the single TPC value and the TPC command for each of the plurality of cells.

99. The non-transitory computer-readable medium of any of clauses 85-98, further comprising code to transmit an indication of a capability to support one or more of: a cell-group TPC command, a cell-group TPC command via unicast DCI, or a cell-group TPC command via group-common DCI.

100. A non-transitory computer-readable medium storing computer executable code, the code when executed by a processor of a base station instructs the processor to:
transmit a single downlink control information (DCI) that indicates a plurality of transmission power control (TPC) commands for a plurality of cells configured for at least one user equipment (UE); and
receive, from the at least one UE, a respective uplink transmission on each of the plurality of cells based on a respective TPC command of the plurality of TPC commands.

101. The non-transitory computer-readable medium of clause 100, wherein the single DCI is a unicast DCI.

102. The non-transitory computer-readable medium of clause 101, wherein the unicast DCI includes a sequence of pairs of a cell identifier and a corresponding TPC value.

103. The non-transitory computer-readable medium of clause 101, wherein the unicast DCI includes a plurality of blocks defining a plurality of DCI positions, each of the plurality of blocks is mapped to a respective cell of the plurality of cells and defines a TPC value for the respective cell.

104. The non-transitory computer-readable medium of clause 101, wherein the unicast DCI includes a TPC value that is mapped to a sequence of transmit power adjustments that define the plurality of TPC commands.

105. The non-transitory computer-readable medium of clause 101, wherein the unicast DCI is a non-scheduling DCI and one or more scheduling fields of the non-scheduling DCI are interpreted as the plurality of TPC commands.

106. The non-transitory computer-readable medium of clause 100, wherein the single DCI is a group-common DCI including a sequence of TPC values for a first UE of the at least one UE and at least one sequence of TPC values for a second UE of the at least one UE, and wherein each of the TPC values for the first UE is mapped to one of the configured cells for the first UE.

107. The non-transitory computer-readable medium of clause 106, wherein the group-common DCI includes a first part defining a single TPC command for one or more other UEs, and a second part defining the sequence of TPC values for the first UE.

108. The non-transitory computer-readable medium of clause 106, further comprising code to transmit a radio resource control (RRC) message that configures the first UE to receive the group-common DCI on one of the plurality of cells configured for the first UE.

109. The non-transitory computer-readable medium of clause 100, wherein the plurality of cells includes cells that are configured with an uplink slot and adjacent in frequency to one or more cells configured with a concurrent downlink slot.

110. The non-transitory computer-readable medium of any of clauses 100-109, wherein the single DCI indicates the plurality of TPC commands based on one or more TPC values that are mapped to a table of transmit power adjustments for cell-group TPC.

111. The non-transitory computer-readable medium of clause 100, wherein the single DCI includes a single TPC value for the UE and the UE is configured with a mapping between the single TPC value and the TPC command for each of the plurality of cells.

112. The non-transitory computer-readable medium of any of clauses 100-111, further comprising code to receive an indication of a capability of the UE to support one or more of: a cell-group TPC command, a cell-group TPC command via unicast DCI, or a cell-group TPC command via group-common DCI.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising, at a user equipment (UE):
    receiving a single downlink control information (DCI) that indicates a plurality of transmission power control (TPC) commands for a plurality of cells that are configured for the UE, wherein the single DCI is a group-common DCI indicating a sequence of TPC values for the UE and at least one TPC value for another UE, and wherein each of the TPC values for the UE is mapped to one of the plurality of cells configured for the UE; and
    adjusting a transmit power for a respective uplink transmission for each respective cell of the plurality of cells based on a respective TPC command of the plurality of TPC commands.

2. The method of claim 1, wherein the group-common DCI includes a first part defining a single TPC command for one or more other UEs, and a second part defining the sequence of TPC values for at least the UE.

3. The method of claim 1, wherein the UE is configured with a DCI position for monitoring for the sequence of TPC values for the UE.

4. The method of claim 1, wherein the UE is configured to receive the group-common DCI on one of the plurality of cells configured for the UE.

5. The method of claim 1, wherein the single DCI indicates the plurality of TPC commands based on one or more TPC values that are mapped to a table of transmit power adjustments for cell-group TPC.

6. The method of claim 1, wherein the single DCI includes a single TPC value for the plurality of TPC commands and wherein the plurality of cells configured for the UE to which the plurality of TPC commands are applicable includes cells that are configured with an uplink slot and adjacent in frequency to one or more cells configured with a concurrent downlink slot.

7. The method of claim 1, wherein the single DCI includes a single TPC value and the UE is configured with a mapping between the single TPC value and the TPC command for each of the plurality of cells.

8. The method of claim 1, further comprising transmitting an indication of a capability to support one or more of: a cell-group TPC command or a cell-group TPC command via group-common DCI.

9. A method of wireless communication, comprising, at a base station:
    transmitting a single downlink control information (DCI) that indicates a plurality of transmission power control (TPC) commands for a plurality of cells configured for at least one user equipment (UE), wherein the single DCI is a group-common DCI including a sequence of TPC values for a first UE of the at least one UE and at least one sequence of TPC values for a second UE of the at least one UE, and wherein each of the TPC values for the first UE is mapped to one of the configured cells for the first UE; and
    receiving, from the at least one UE, a respective uplink transmission on each of the plurality of cells based on a respective TPC command of the plurality of TPC commands.

10. The method of claim 9, wherein the group-common DCI includes a first part defining a single TPC command for one or more other UEs, and a second part defining the sequence of TPC values for the first UE.

11. The method of claim 9, further comprising transmitting a radio resource control (RRC) message that configures the first UE to receive the group-common DCI on one of the plurality of cells configured for the first UE.

12. The method of claim 9, wherein the plurality of cells includes cells that are configured with an uplink slot and adjacent in frequency to one or more cells configured with a concurrent downlink slot.

13. The method of claim 9, wherein the single DCI indicates the plurality of TPC commands based on one or more TPC values that are mapped to a table of transmit power adjustments for cell-group TPC.

14. The method of claim 9, wherein the single DCI includes a single TPC value for the UE and the UE is configured with a mapping between the single TPC value and the TPC command for each of the plurality of cells.

15. The method of claim 9, further comprising receiving an indication of a capability of the UE to support one or more of: a cell-group TPC command or a cell-group TPC command via group-common DCI.

16. An apparatus of a user equipment (UE) for wireless communication, comprising:
    a memory storing computer-executable instructions; and
    at least one processor coupled with the memory and configured to execute the instructions to:
        receive a single downlink control information (DCI) that indicates a plurality of transmission power control (TPC) commands for a plurality of cells that are configured for the UE, wherein the single DCI is a group-common DCI indicating a sequence of TPC values for the UE and at least one TPC value for another UE, and wherein each of the TPC values for the UE is mapped to one of the plurality of cells configured for the UE; and adjust a transmit power for a respective uplink transmission for each respective cell of the plurality of cells based on a respective TPC command of the plurality of TPC commands.

17. The apparatus of claim 16, wherein the group-common DCI includes a first part defining a single TPC command for one or more other UEs, and a second part defining the sequence of TPC values for at least the UE.

18. The apparatus of claim 16, wherein the UE is configured with a DCI position for monitoring for the sequence of TPC values for the UE.

19. The apparatus of claim 16, wherein the UE is configured to receive the group-common DCI on one of the plurality of cells configured for the UE.

20. The apparatus of claim 16, wherein the single DCI indicates the plurality of TPC commands based on one or more TPC values that are mapped to a table of transmit power adjustments for cell-group TPC.

21. The apparatus of claim 16, wherein the single DCI includes a single TPC value for the plurality of TPC commands and wherein the plurality of cells configured for the UE to which the plurality of TPC commands are applicable includes cells that are configured with an uplink slot and adjacent in frequency to one or more cells configured with a concurrent downlink slot.

22. The apparatus of claim 16, wherein the single DCI includes a single TPC value and the UE is configured with a mapping between the single TPC value and the TPC command for each of the plurality of cells.

23. The apparatus of claim 16, wherein the at least one processor is configured to transmit an indication of a capability to support one or more of: a cell-group TPC command or a cell-group TPC command via group-common DCI.

24. An apparatus of a base station for wireless communication, comprising:

a memory storing computer-executable instructions; and
at least one processor coupled to the memory and configured to execute the instructions to:
transmit a single downlink control information (DCI) that indicates a plurality of transmission power control (TPC) commands for a plurality of cells configured for at least one user equipment (UE), wherein the single DCI is a group-common DCI including a sequence of TPC values for a first UE of the at least one UE and at least one sequence of TPC values for a second UE of the at least one UE, and wherein each of the TPC values for the first UE is mapped to one of the configured cells for the first UE; and
receive, from the at least one UE, a respective uplink transmission on each of the plurality of cells based on a respective TPC command of the plurality of TPC commands.

25. The apparatus of claim 24, wherein the group-common DCI includes a first part defining a single TPC command for one or more other UEs, and a second part defining the sequence of TPC values for the first UE.

26. The apparatus of claim 24, wherein the at least one processor is configured to transmit a radio resource control (RRC) message that configures the first UE to receive the group-common DCI on one of the plurality of cells configured for the first UE.

27. The apparatus of claim 24, wherein the plurality of cells includes cells that are configured with an uplink slot and adjacent in frequency to one or more cells configured with a concurrent downlink slot.

28. The apparatus of claim 24, wherein the single DCI indicates the plurality of TPC commands based on one or more TPC values that are mapped to a table of transmit power adjustments for cell-group TPC.

29. The apparatus of claim 24, wherein the single DCI includes a single TPC value for the UE and the UE is configured with a mapping between the single TPC value and the TPC command for each of the plurality of cells.

30. The apparatus of claim 24, wherein the at least one processor is configured to receive an indication of a capability of the UE to support one or more of: a cell-group TPC command, a cell-group TPC command via unicast DCI, or a cell-group TPC command via group-common DCI.

* * * * *